(12) United States Patent
Inamoto et al.

(10) Patent No.: US 10,950,152 B2
(45) Date of Patent: Mar. 16, 2021

(54) LASER SCANNING DISPLAY WITH LUMINANCE ADJUSTMENT

(71) Applicants: Makoto Inamoto, Ishikawa (JP);
Yoshinori Hayashi, Kanagawa (JP);
Hiroyuki Tanabe, Tokyo (JP)

(72) Inventors: Makoto Inamoto, Ishikawa (JP);
Yoshinori Hayashi, Kanagawa (JP);
Hiroyuki Tanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/486,929

(22) PCT Filed: Mar. 13, 2018

(86) PCT No.: PCT/JP2018/009713
§ 371 (c)(1),
(2) Date: Aug. 19, 2019

(87) PCT Pub. No.: WO2018/168846
PCT Pub. Date: Sep. 20, 2018

(65) Prior Publication Data
US 2020/0380900 A1 Dec. 3, 2020

(30) Foreign Application Priority Data

Mar. 15, 2017 (JP) .............................. JP2017-049274
Jan. 18, 2018 (JP) .............................. JP2018-006229

(51) Int. Cl.
*G09G 3/02* (2006.01)
*G02B 26/10* (2006.01)
*G02B 27/01* (2006.01)

(52) U.S. Cl.
CPC .............. *G09G 3/025* (2013.01); *G02B 26/10* (2013.01); *G02B 27/0101* (2013.01); *G09G 2320/064* (2013.01)

(58) Field of Classification Search
None
See application file for complete search history.

(56) References Cited

U.S. PATENT DOCUMENTS 9,158,124 B2  10/2015 Saisho et al.
9,746,669 B2   8/2017 Saisho et al.
(Continued)

FOREIGN PATENT DOCUMENTS

EP    3104212       12/2016
JP    2010-145924   7/2010
(Continued)

OTHER PUBLICATIONS

International Search Report dated Jun. 21, 2018 in PCT/JP2018/009713 filed on Mar. 13, 2018.

*Primary Examiner* — Matthew Yeung
(74) *Attorney, Agent, or Firm* — IPUSA, PLLC

(57) ABSTRACT

A HUD device comprising a display device for scanning with light emitted by a light source (e.g., an LD) an optical element array (e.g., a micro lens array) including multiple optical elements (e.g., micro lenses) to form an image and for projecting the light that has formed the image. The display device includes a control unit 8060 that is capable of changing output power of the light In this case, it is possible to provide a display device that is capable of adjusting luminance of an image while controlling against luminance unevenness of the image from occurring.

17 Claims, 39 Drawing Sheets

(56) References Cited

U.S. PATENT DOCUMENTS

| | | |
|---|---|---|
| 9,798,140 B2 | 10/2017 | Inamoto et al. |
| 10,031,343 B2 | 7/2018 | Saisho et al. |
| 2007/0273957 A1* | 11/2007 | Zalevsky ............ G02B 27/1093 359/326 |
| 2014/0253527 A1* | 9/2014 | Ogi ..................... G09G 5/02 345/207 |
| 2015/0062345 A1* | 3/2015 | Kusanagi ............... G02B 27/01 348/162 |
| 2015/0219803 A1 | 8/2015 | Inamoto et al. |
| 2015/0294609 A1 | 10/2015 | Ohyama et al. |
| 2016/0320615 A1 | 11/2016 | Nakamura et al. |
| 2017/0098400 A1* | 4/2017 | Yamakawa ............. G02B 27/01 |
| 2017/0154558 A1 | 6/2017 | Atsuumi et al. |
| 2017/0315353 A1 | 11/2017 | Saisho et al. |
| 2018/0252916 A1 | 9/2018 | Nakamura et al. |
| 2018/0267306 A1 | 9/2018 | Nakamura et al. |

FOREIGN PATENT DOCUMENTS

| | | |
|---|---|---|
| JP | 2014-132286 | 7/2014 |
| JP | 2017-032971 | 2/2017 |
| JP | 2018-136523 | 8/2018 |
| JP | 2018-146950 | 9/2018 |
| JP | 2018-156063 | 10/2018 |

* cited by examiner

[Fig. 1]
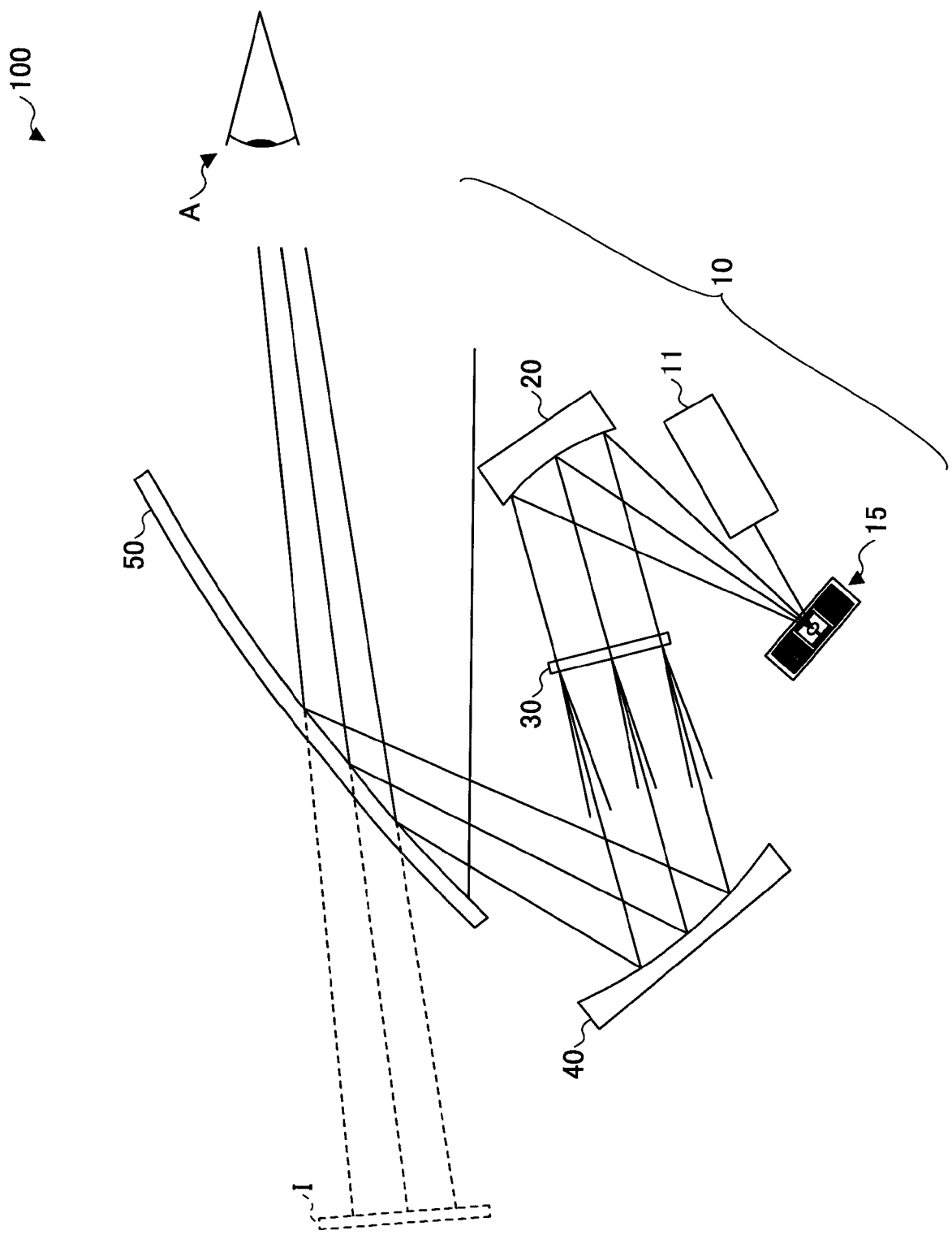

[Fig. 2]
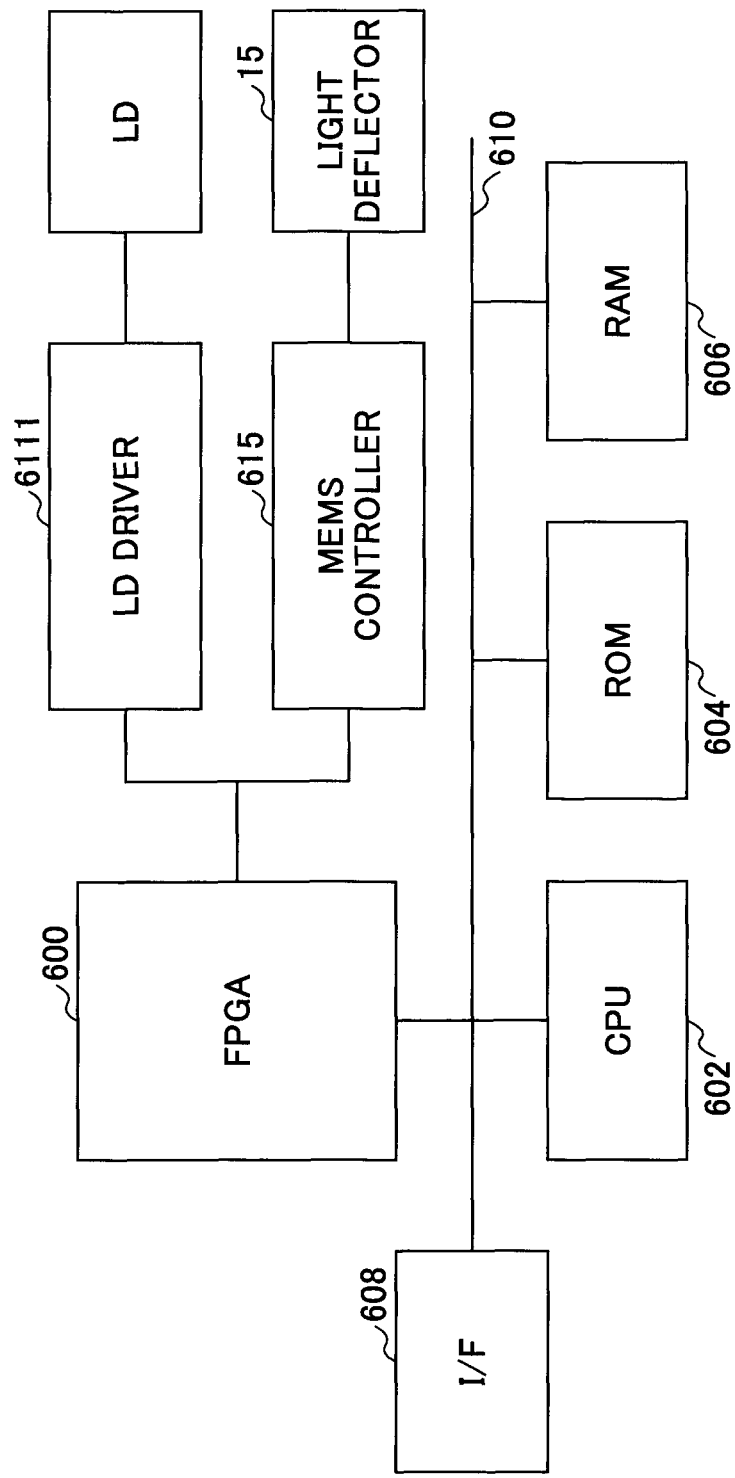

[Fig. 3]
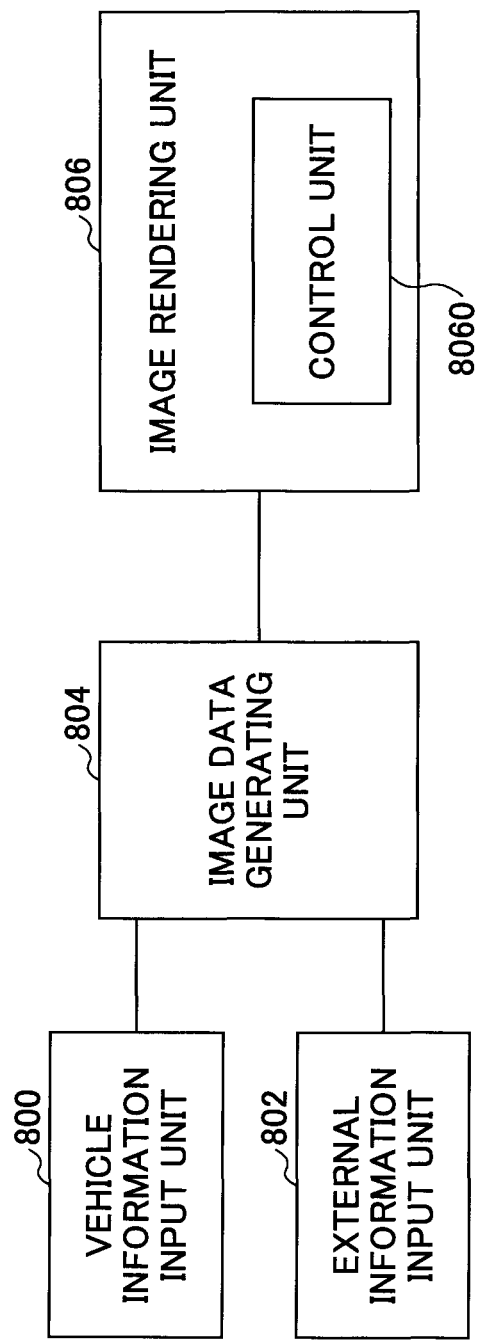

[Fig. 4]
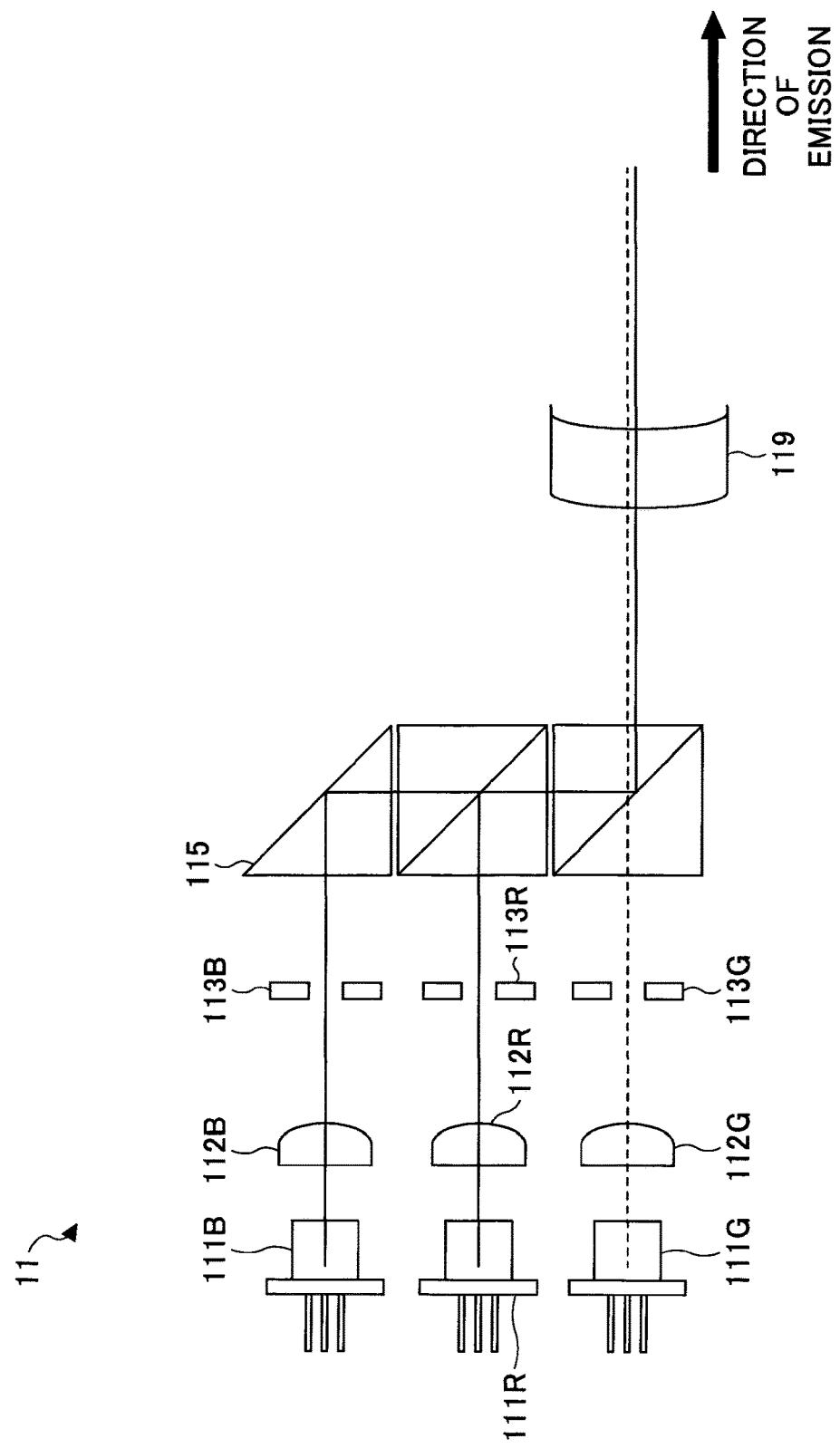

[Fig. 5]
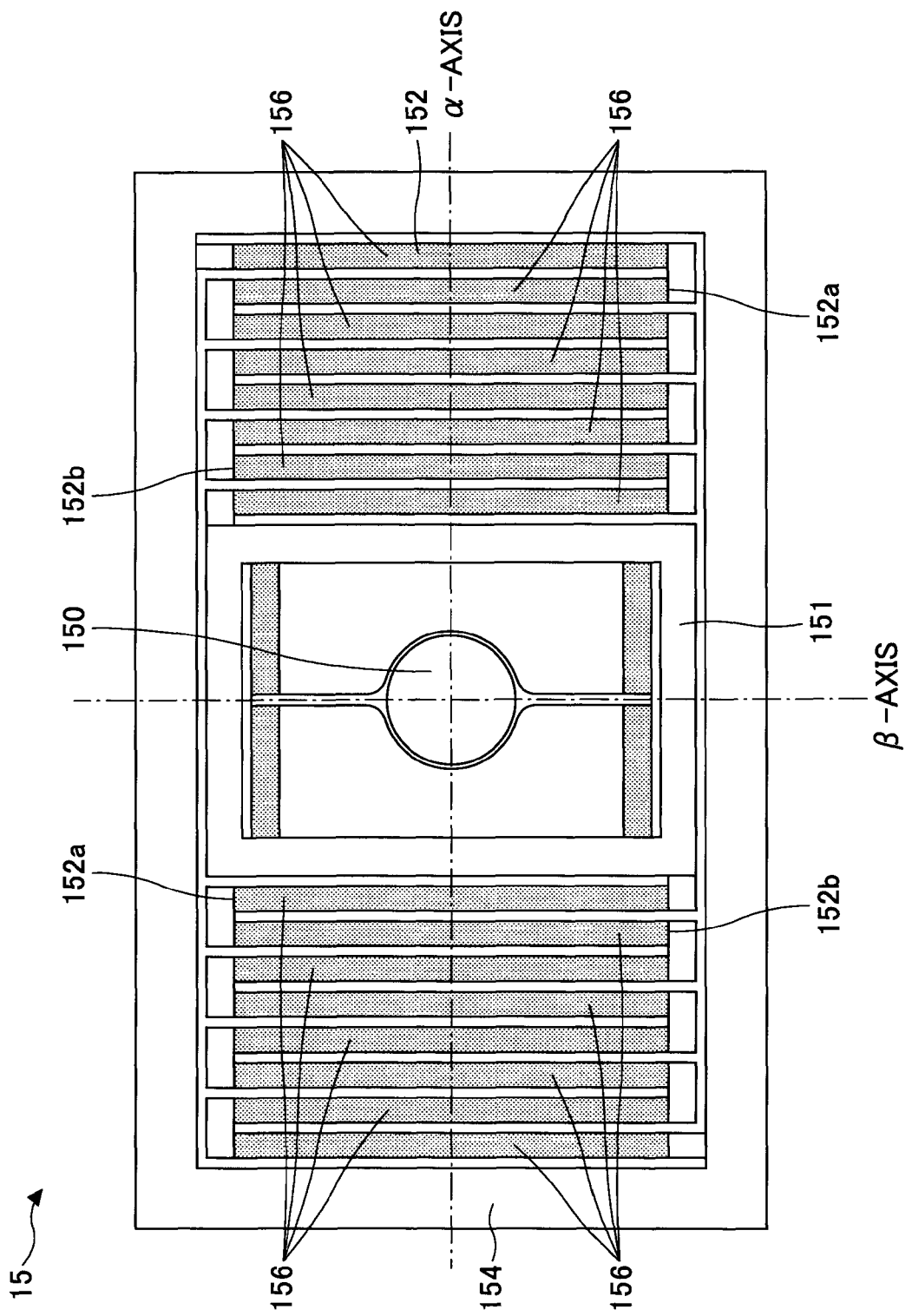

[Fig. 6]
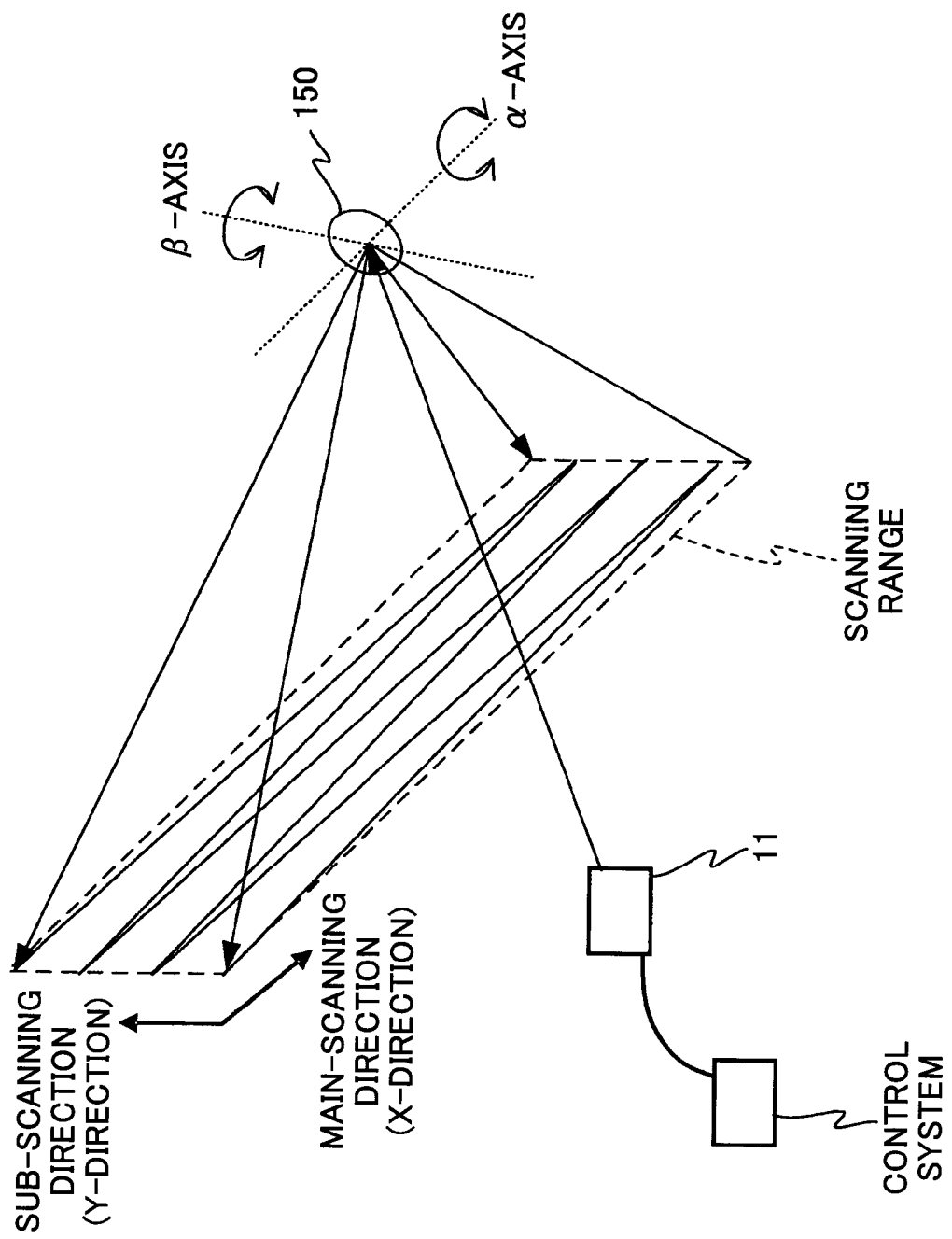

[Fig. 7]
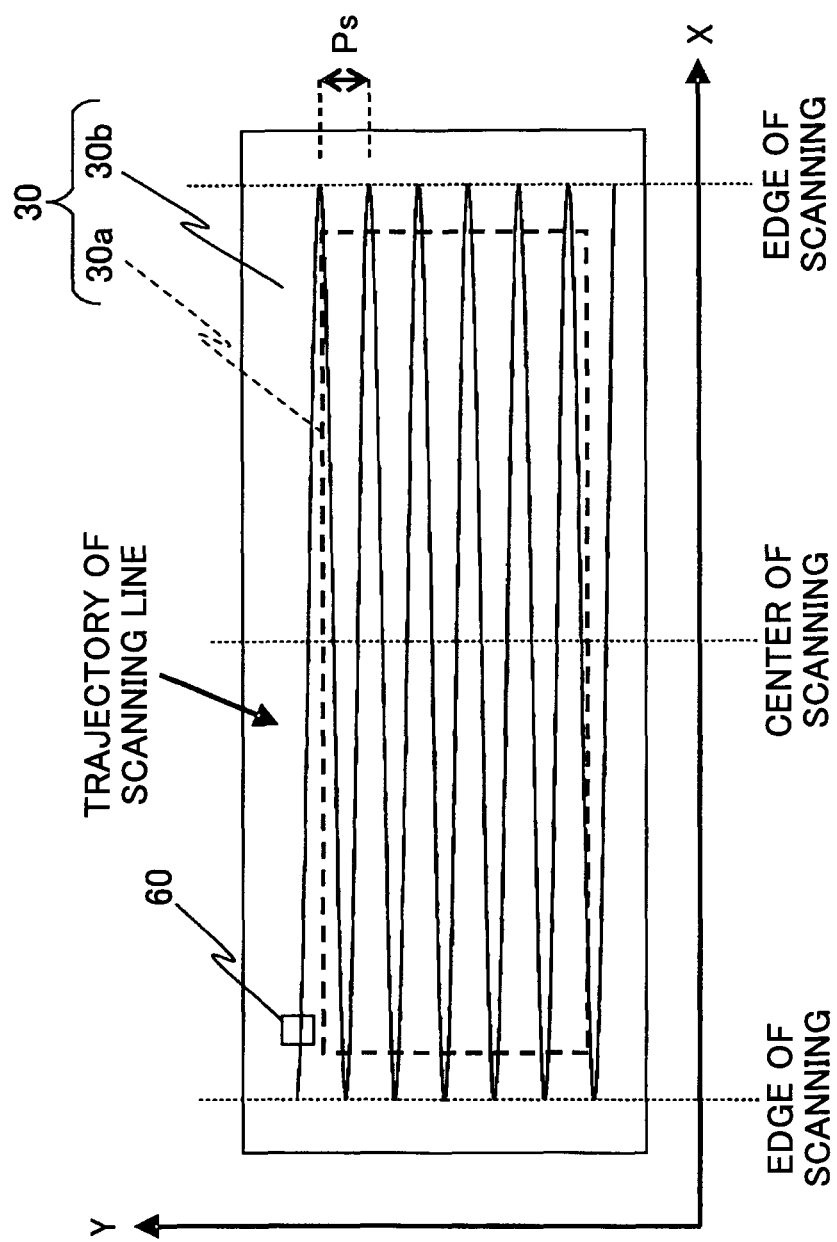

[Fig. 8A]
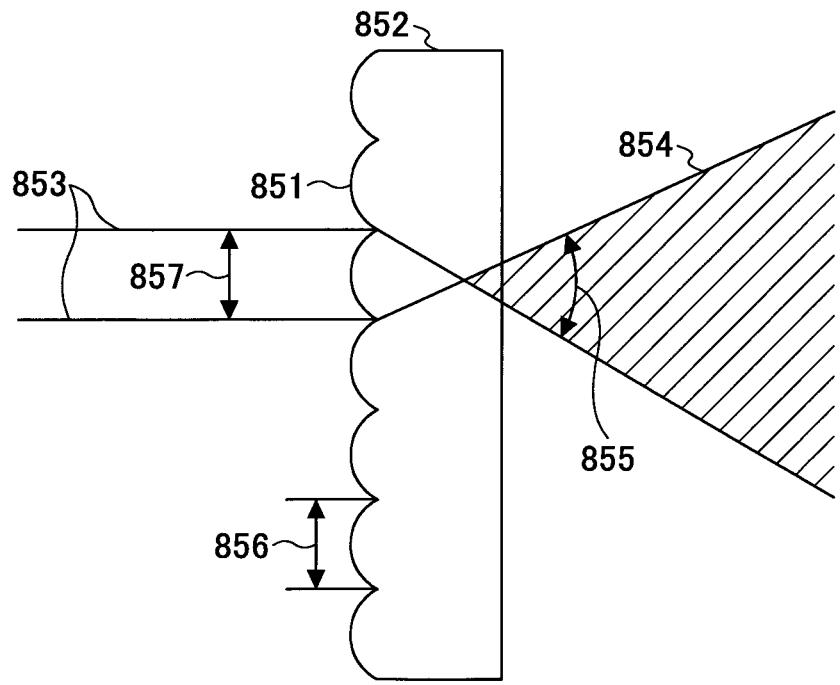
[Fig. 8B]
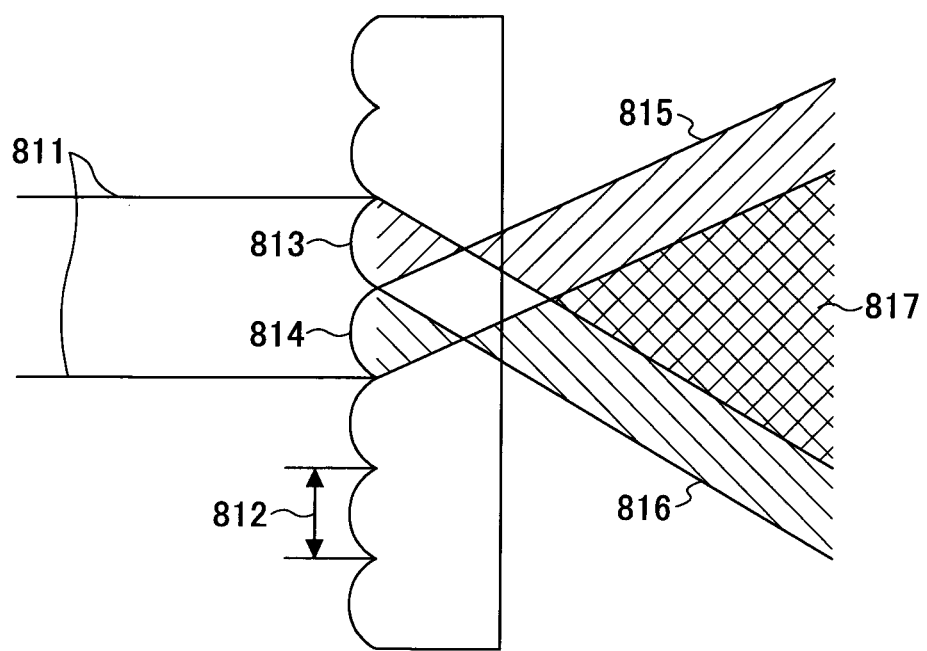

[Fig. 9]
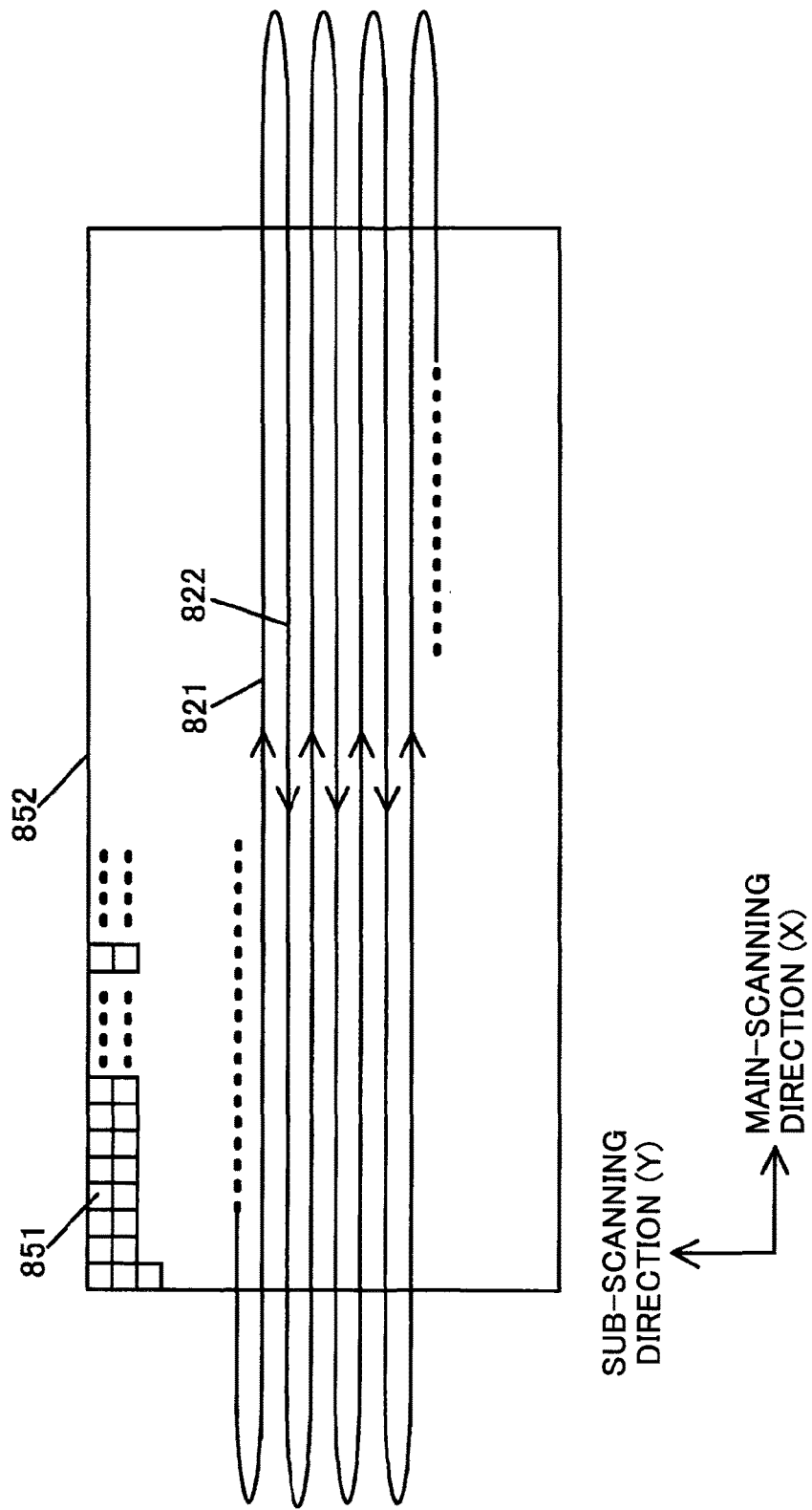

[Fig. 10]
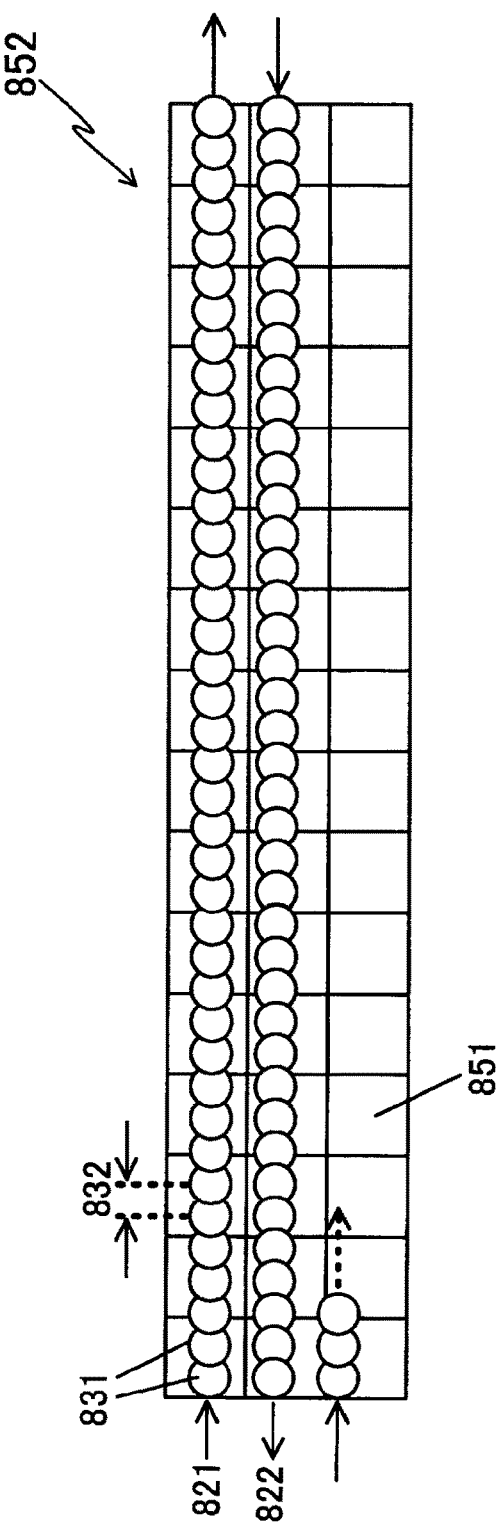

[Fig. 11]
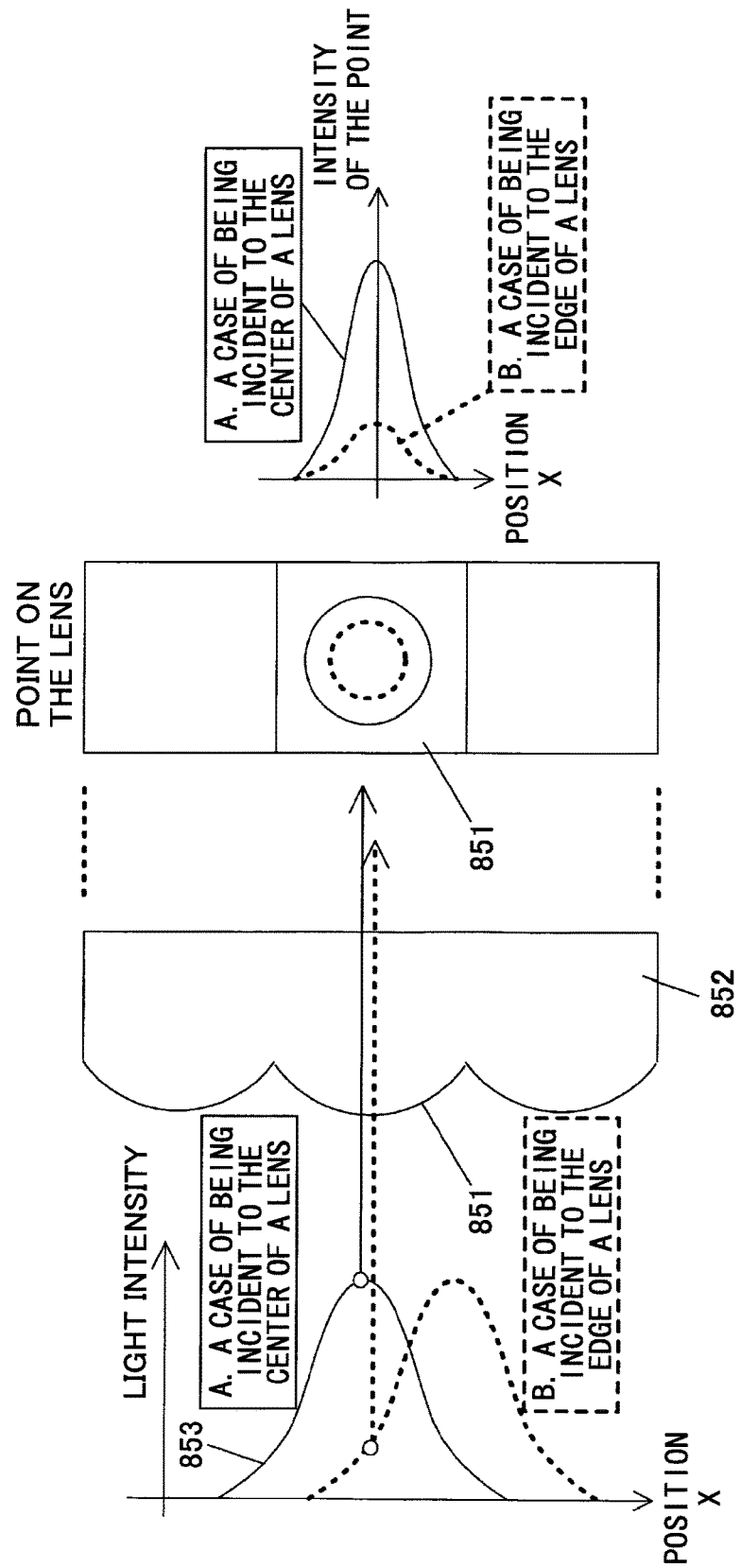

[Fig. 12]
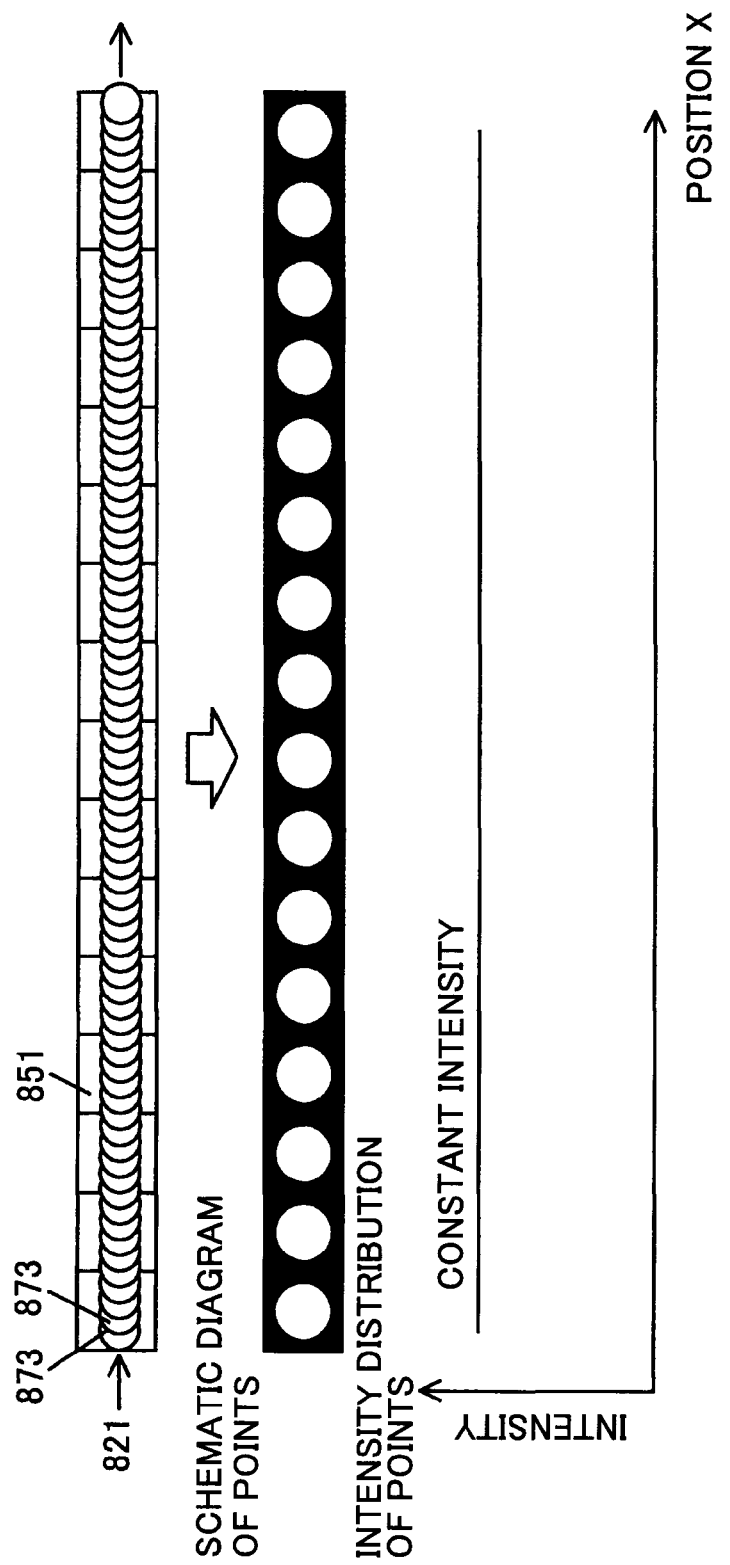

[Fig. 13]
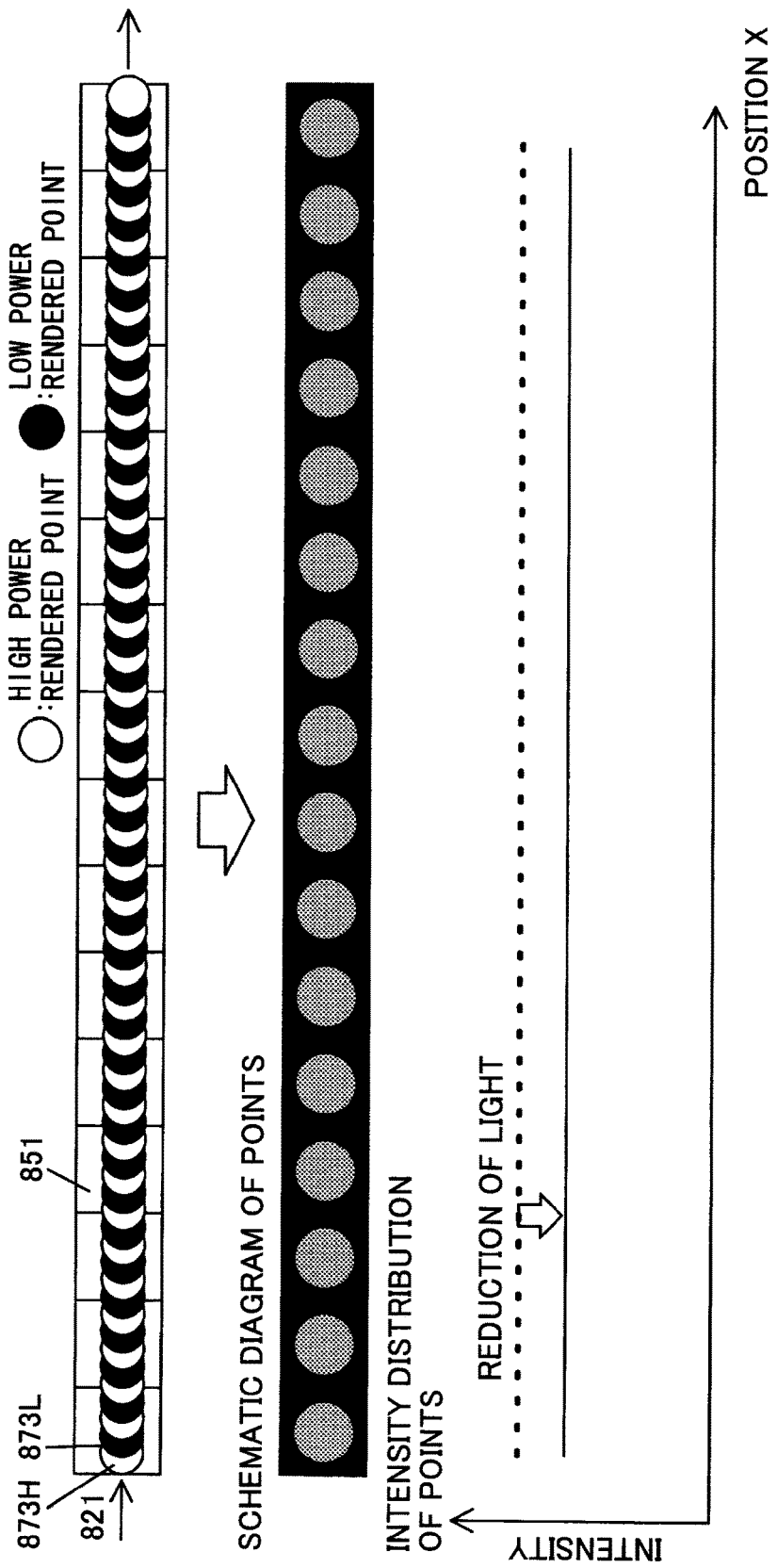

[Fig. 14]
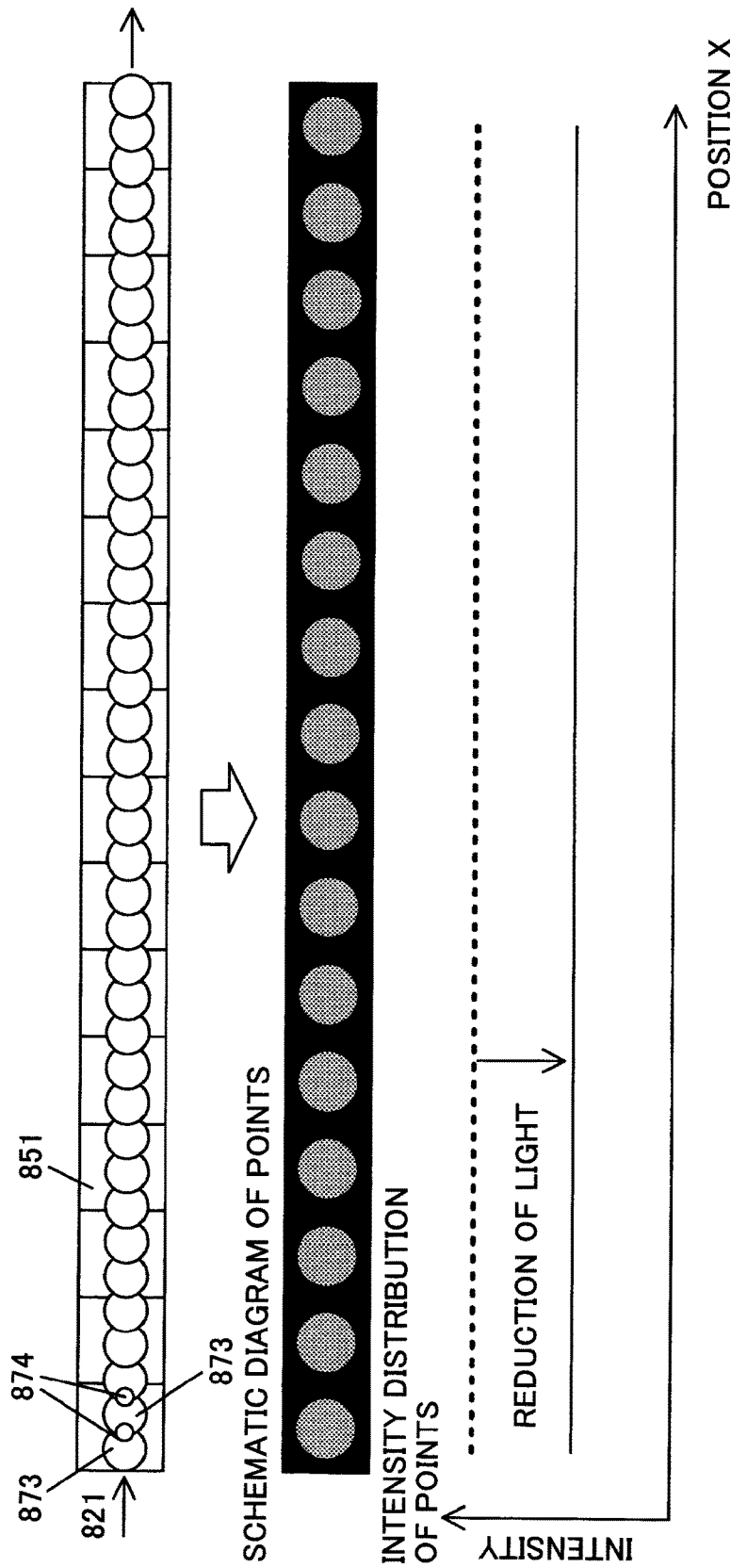

[Fig. 15A]
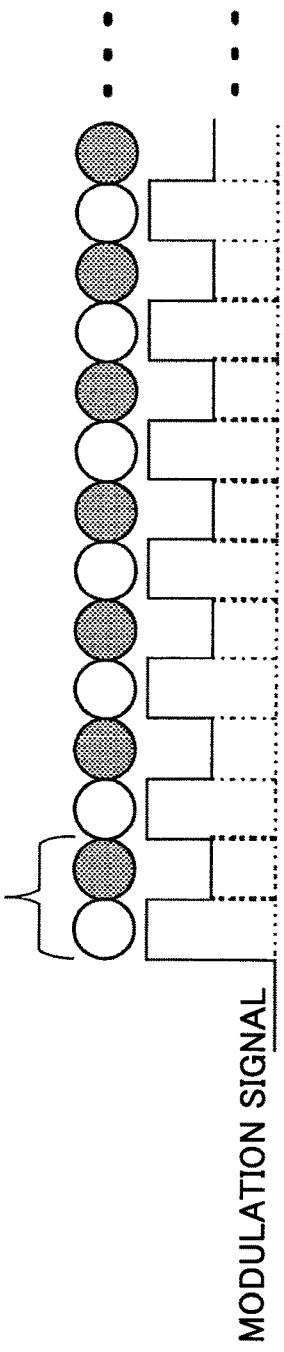

[Fig. 15B]
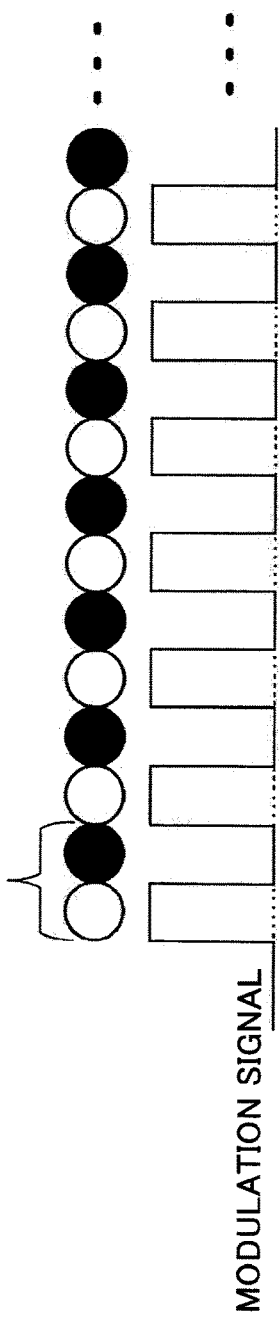

[Fig. 15C]
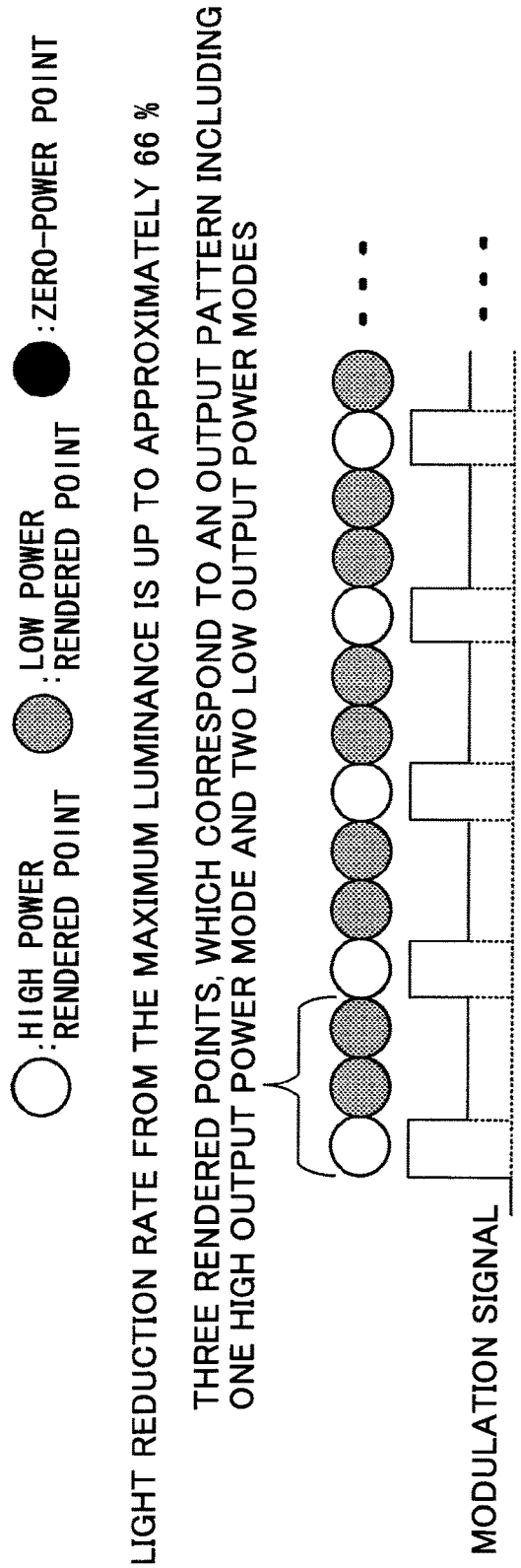

[Fig. 15D]
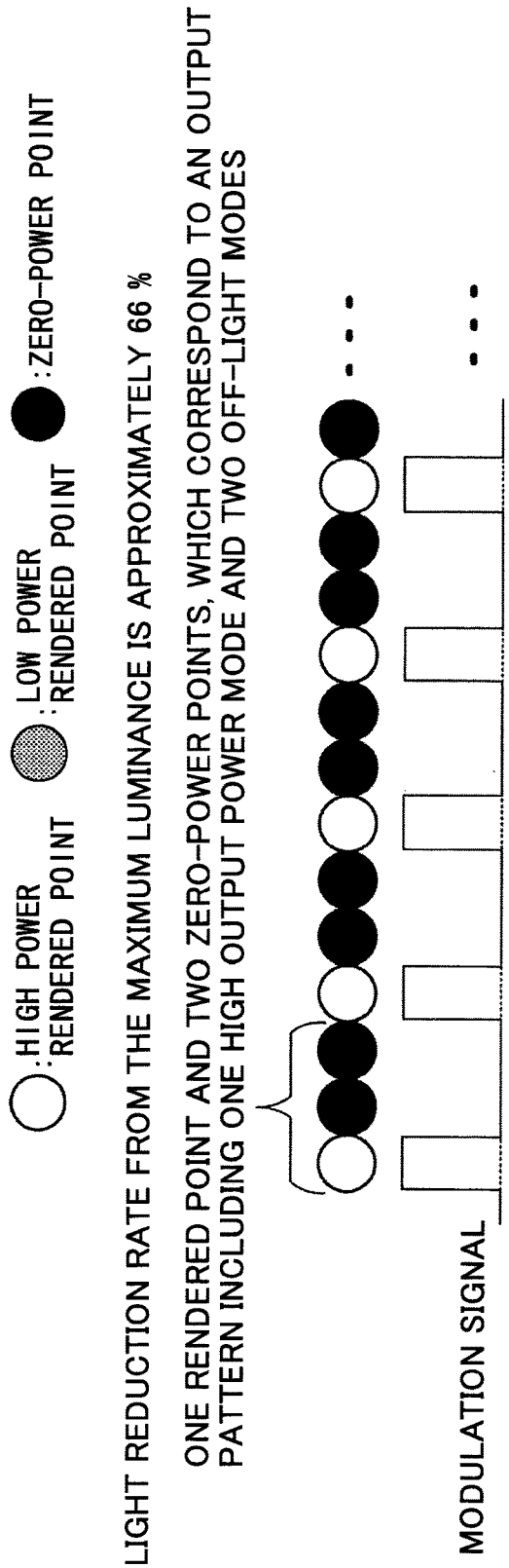

[Fig. 15E]
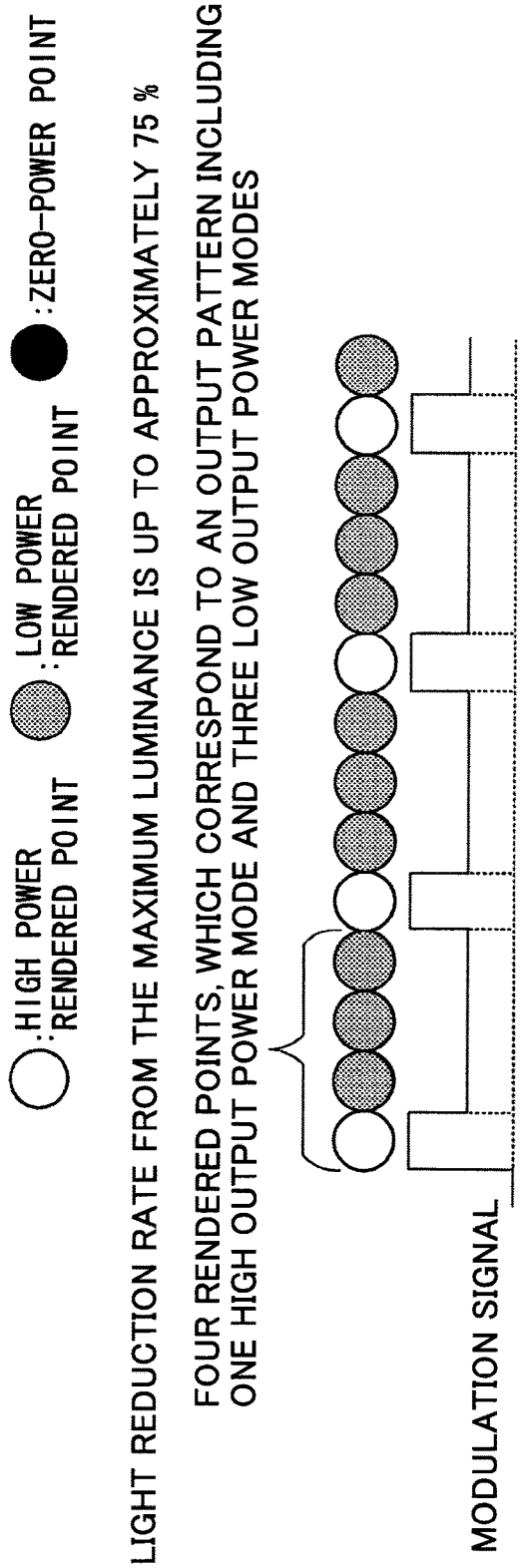

[Fig. 15F]
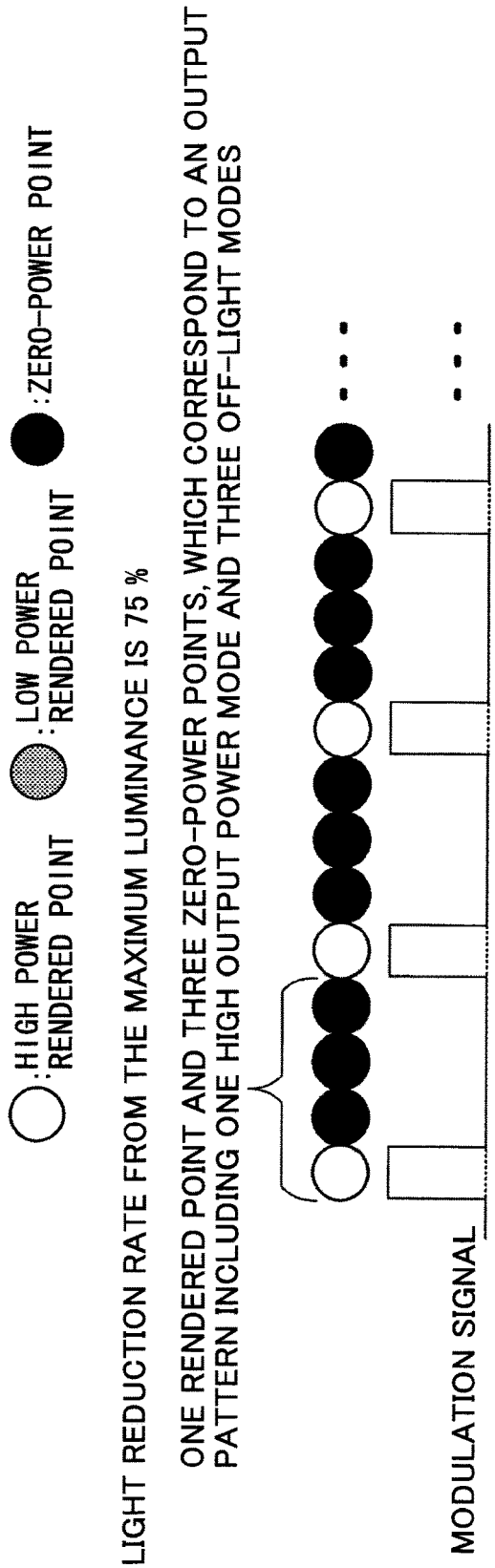

[Fig. 16]
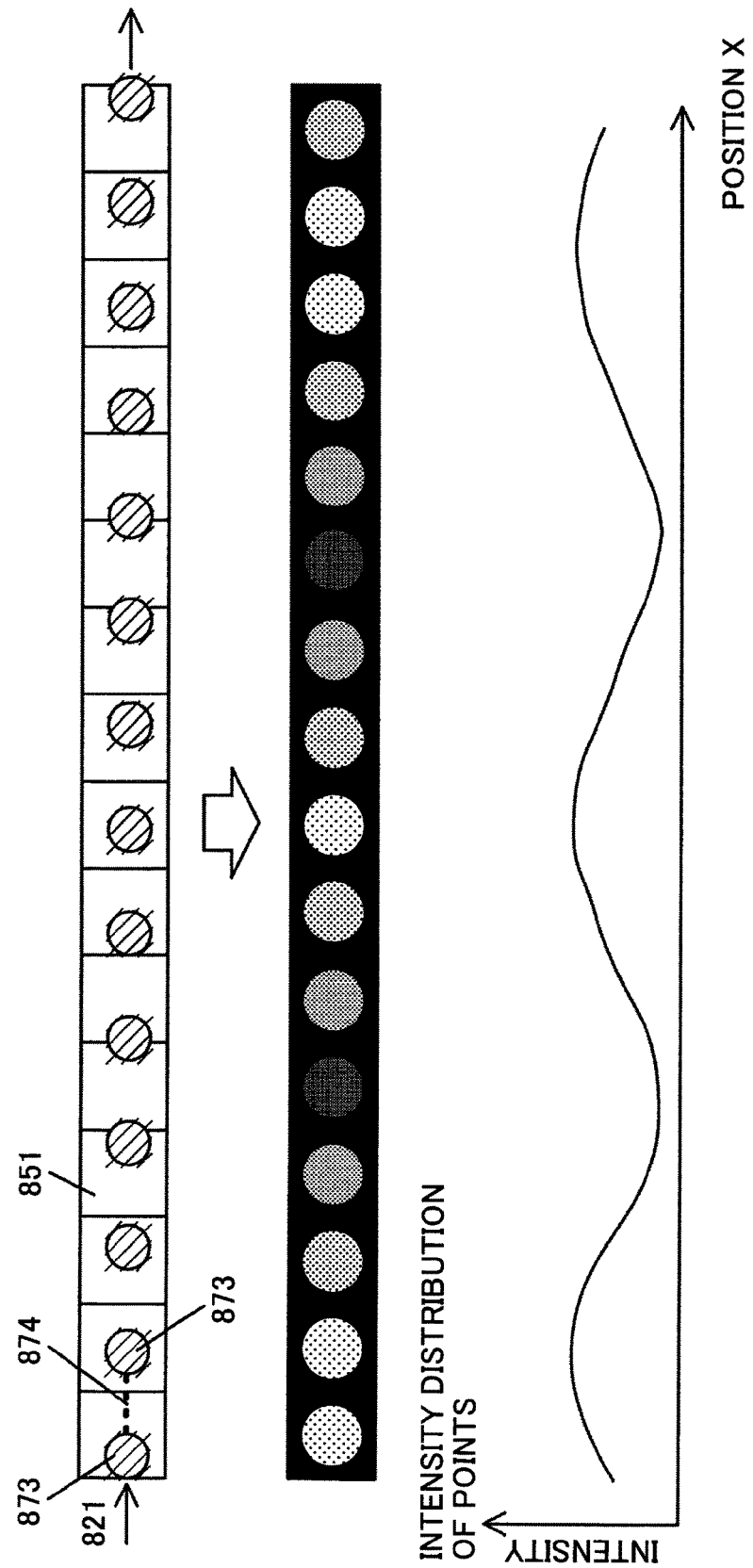

[Fig. 17A]
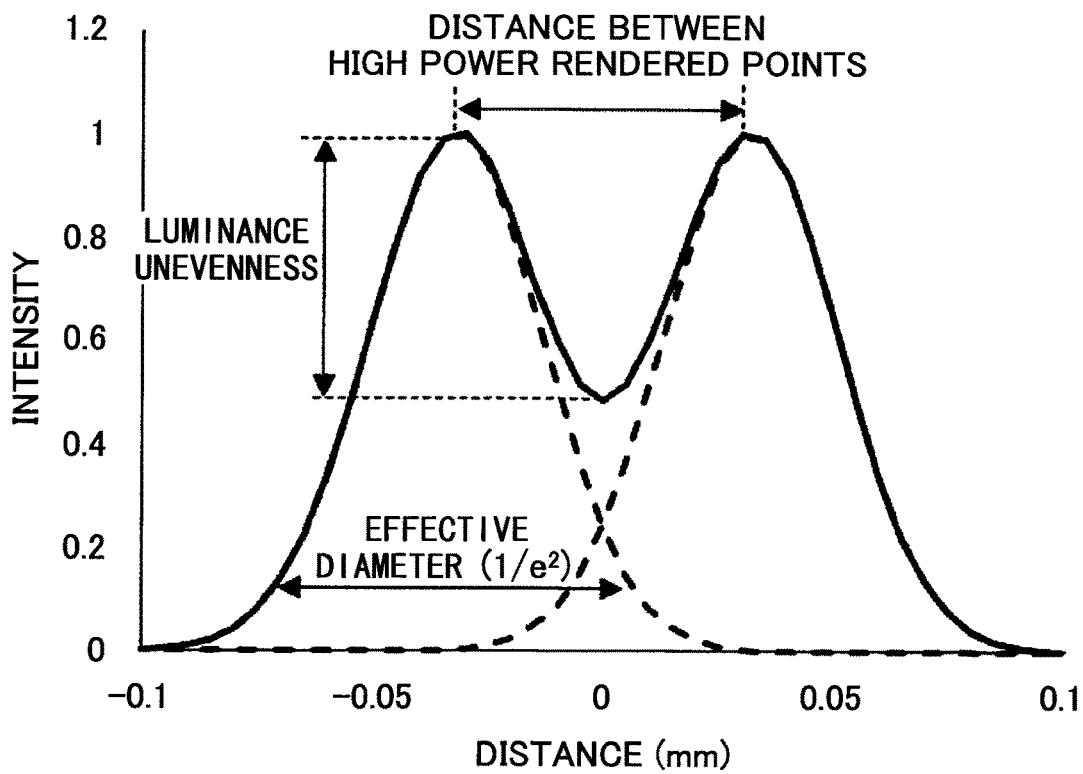
[Fig. 17B]
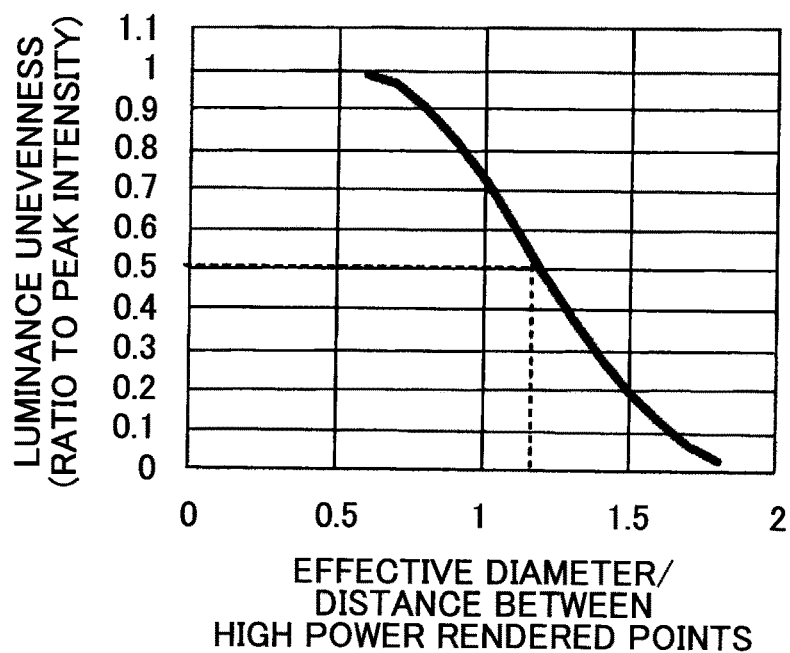

[Fig. 18]
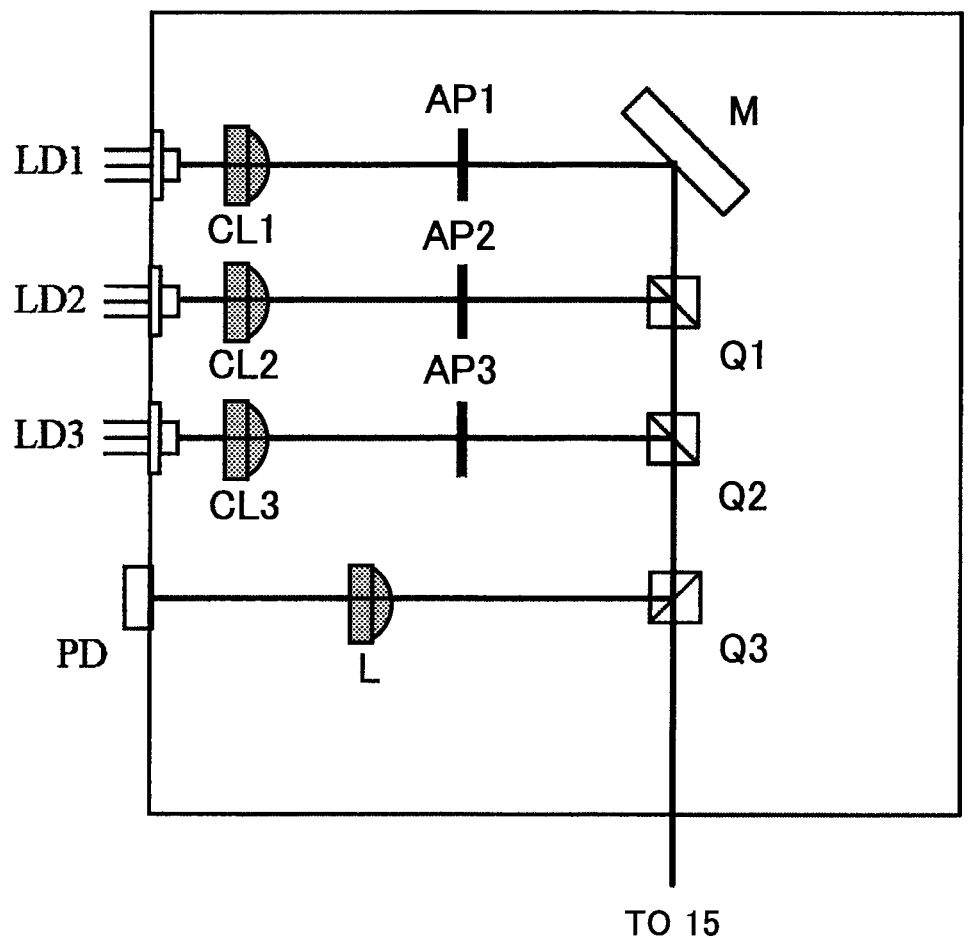
[Fig. 19A]
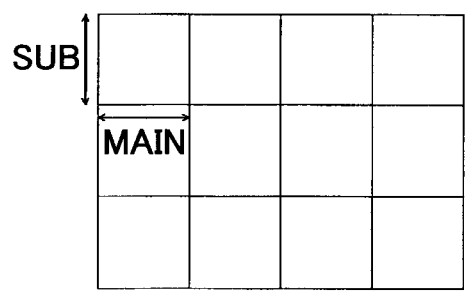

[Fig. 19B]
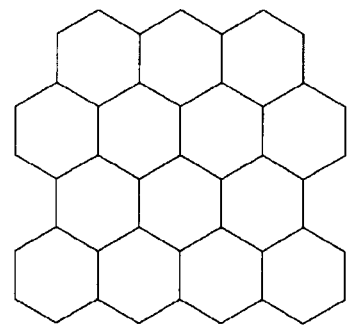
[Fig. 19C]
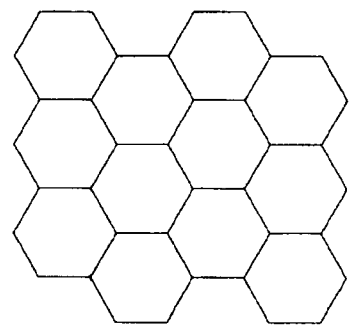
[Fig. 19D]
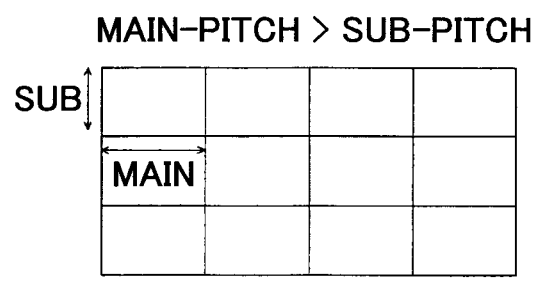

[Fig. 19E]
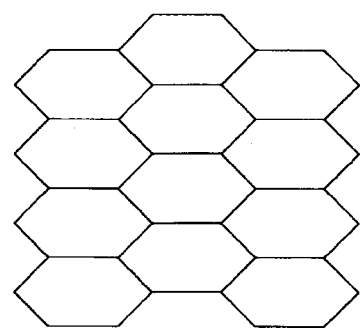
[Fig. 19F]
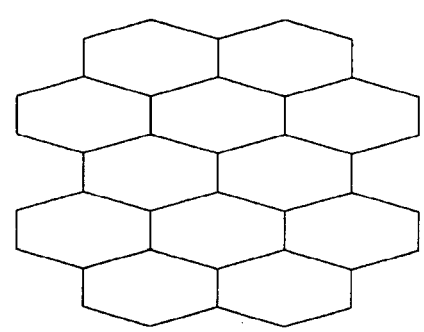

[Fig. 20]
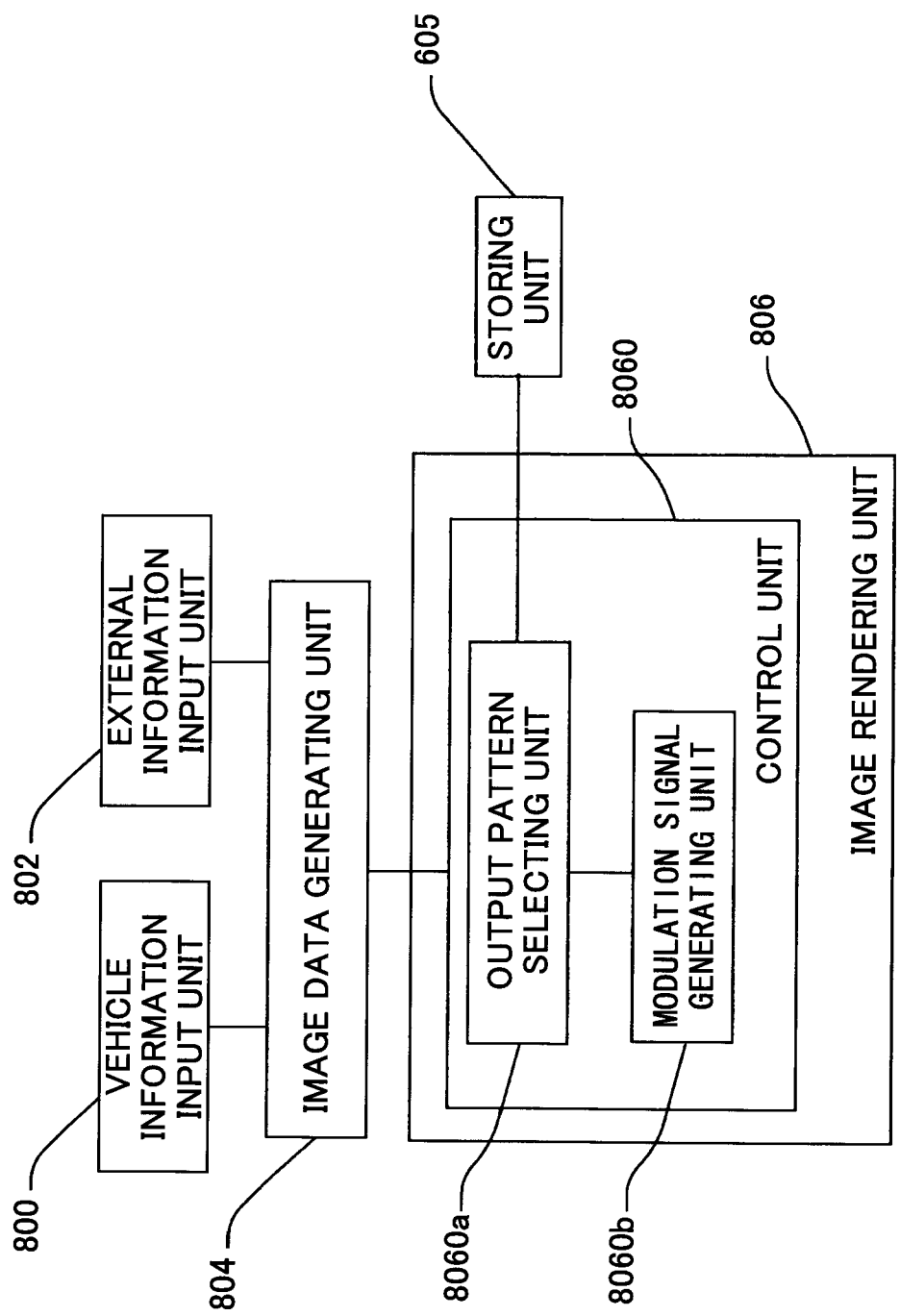

[Fig. 21]
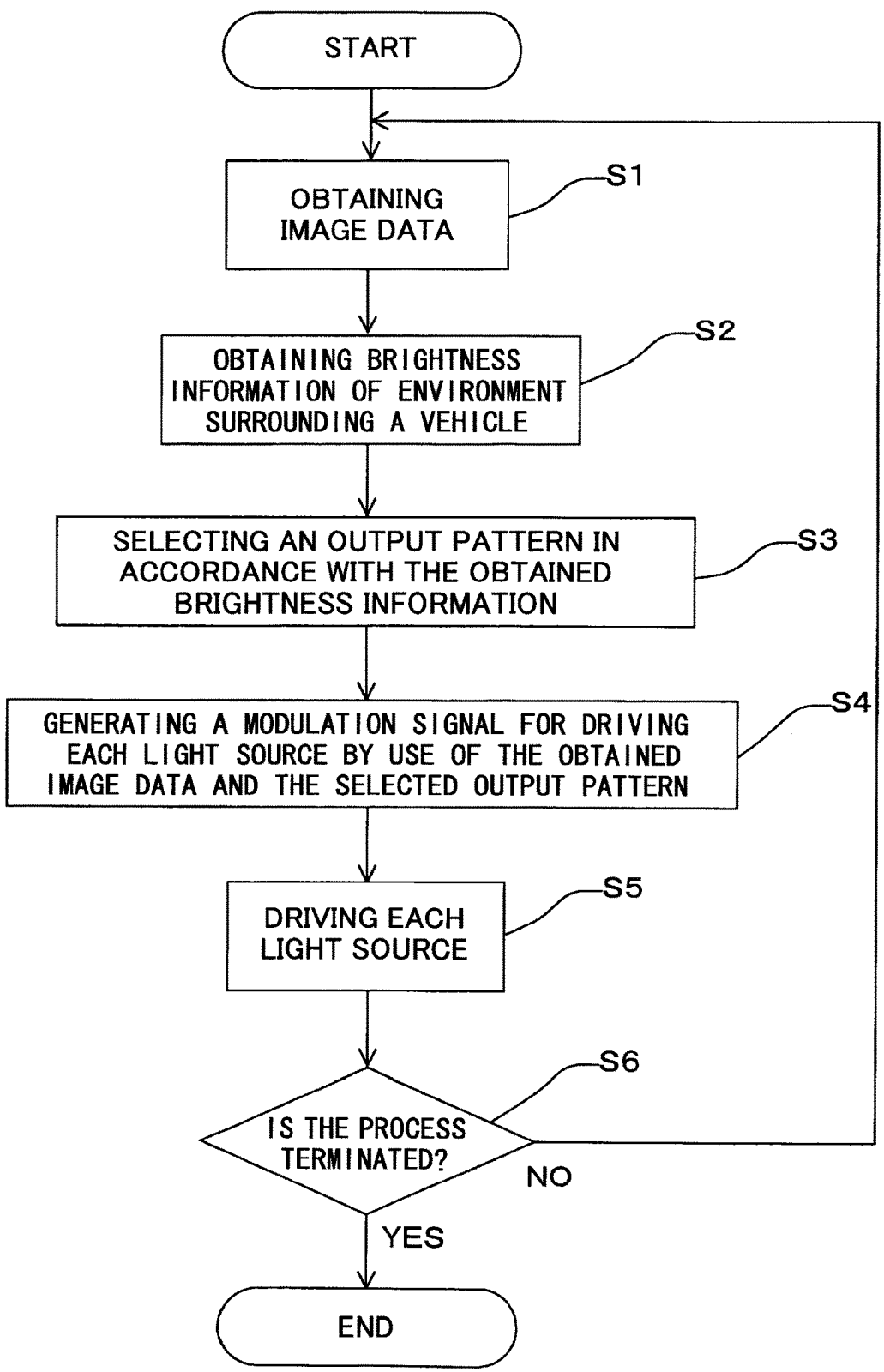

[Fig. 22A]
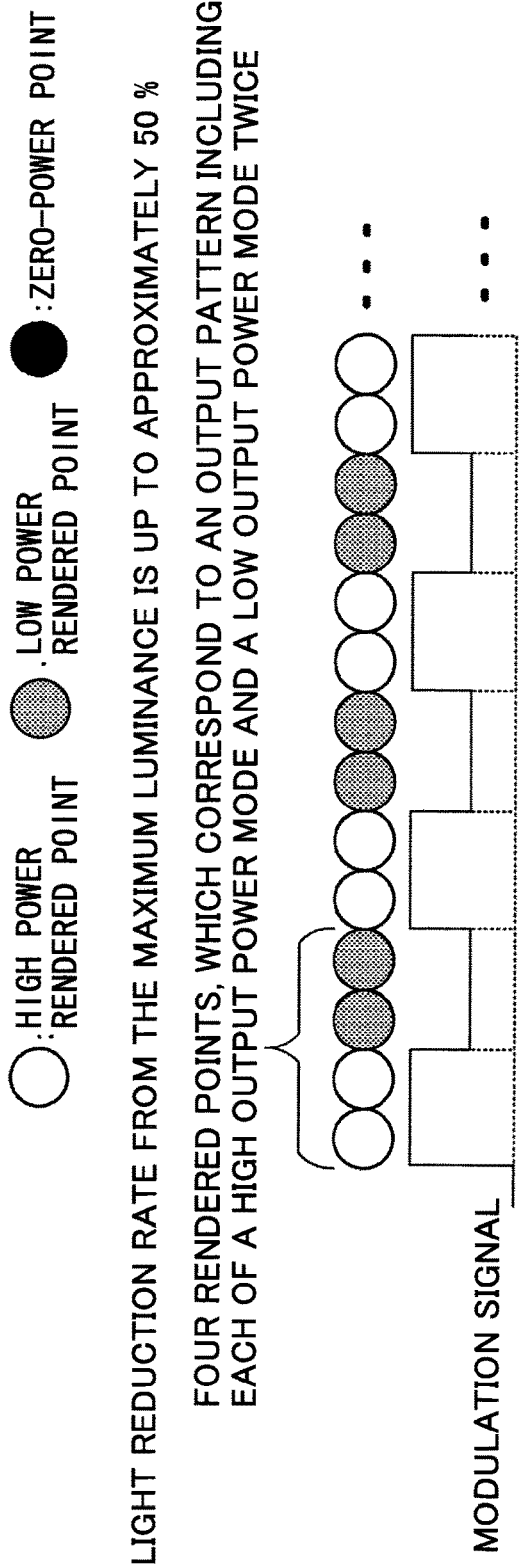

[Fig. 22B]
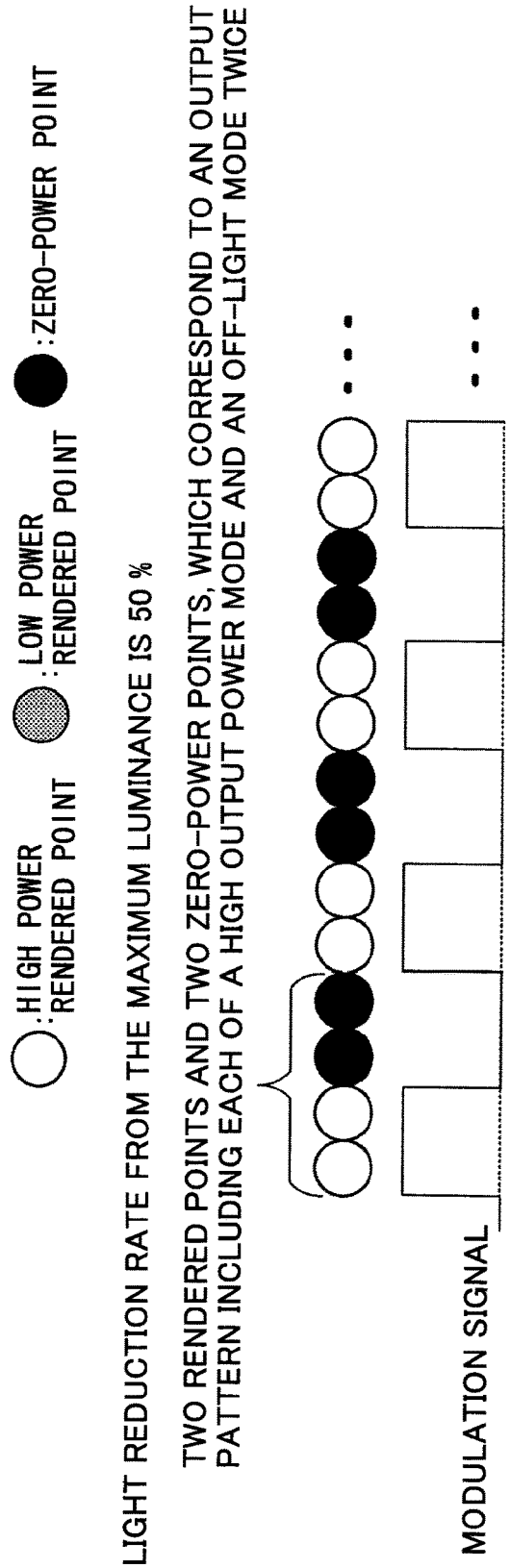

[Fig. 22C]
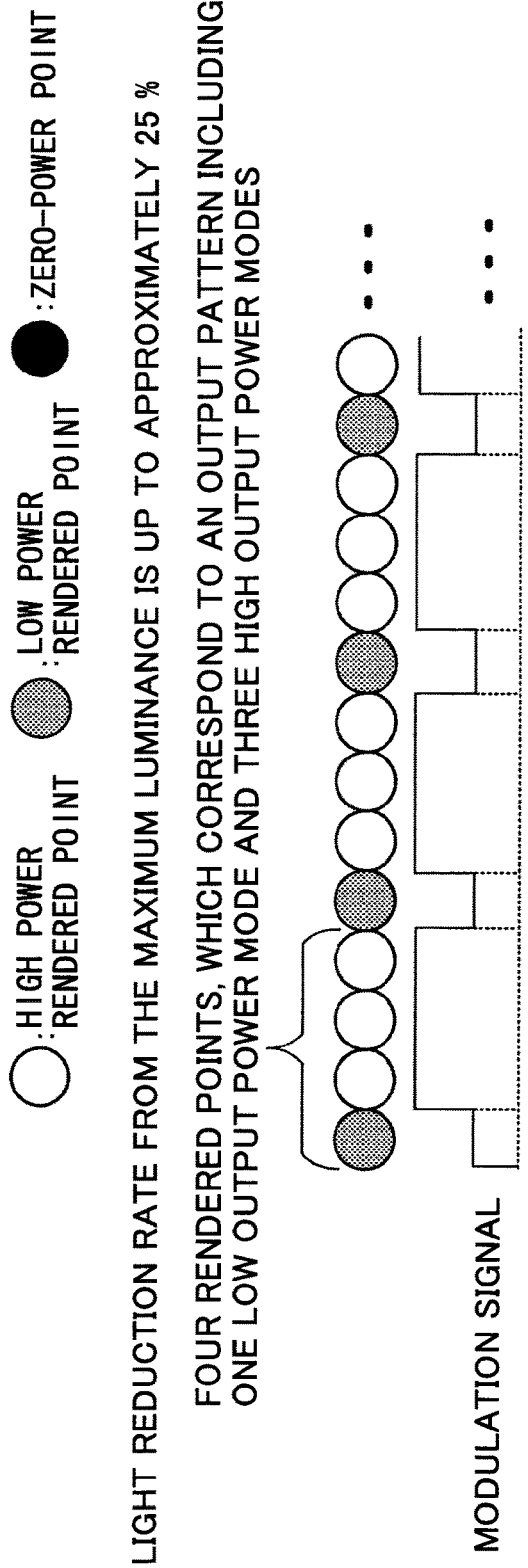

[Fig. 22D]
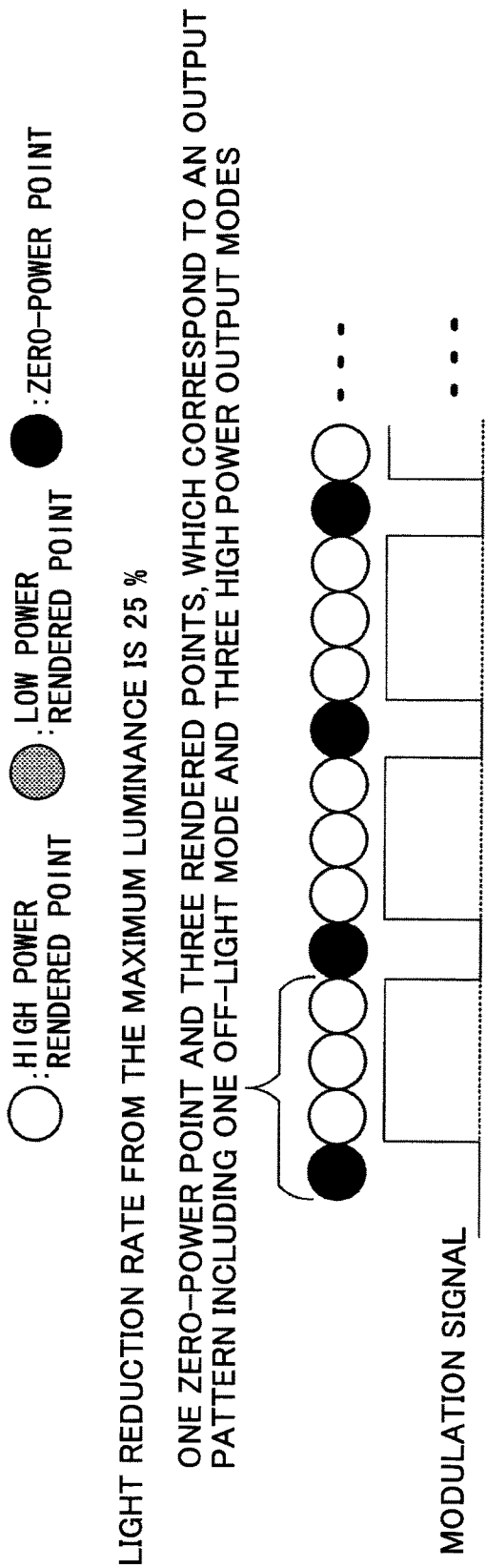

[Fig. 22E]
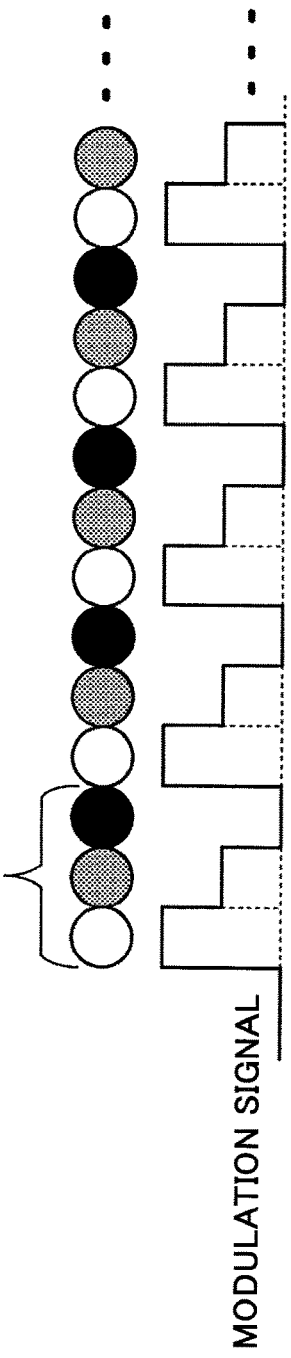

[Fig. 22F]
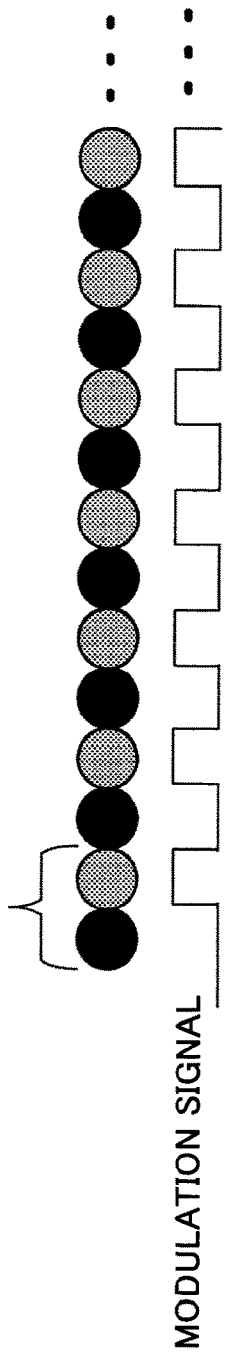

[Fig. 23A]
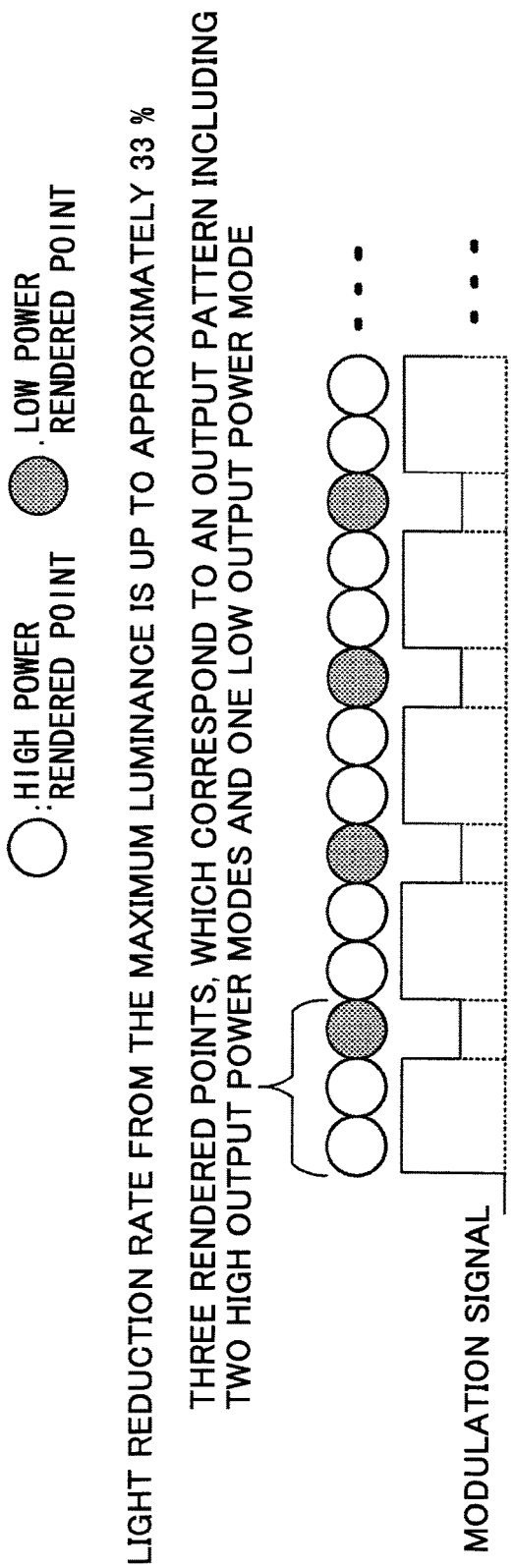

[Fig. 23B]
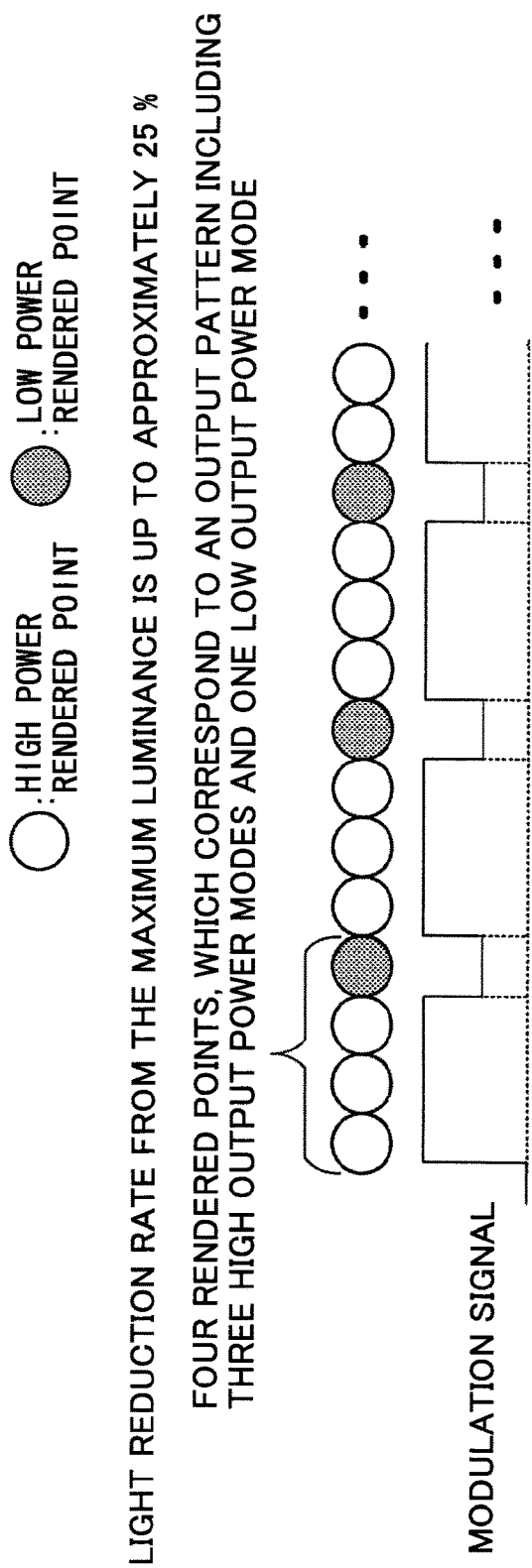

[Fig. 23C]
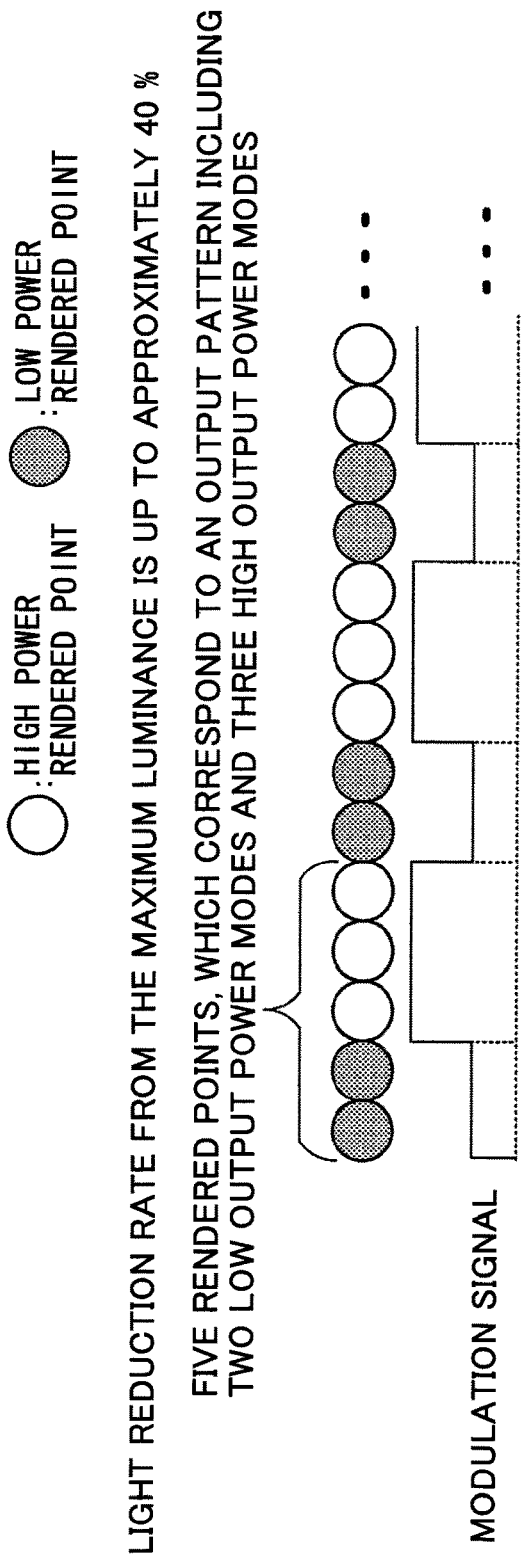

[Fig. 23D]
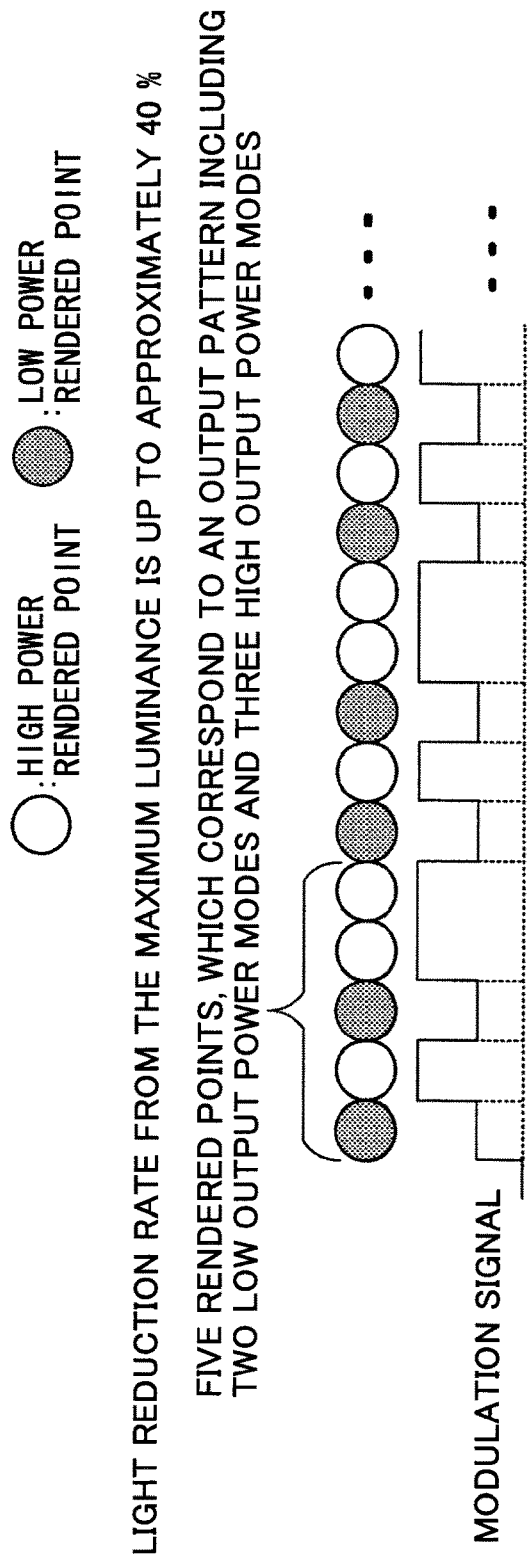

[Fig. 23E]
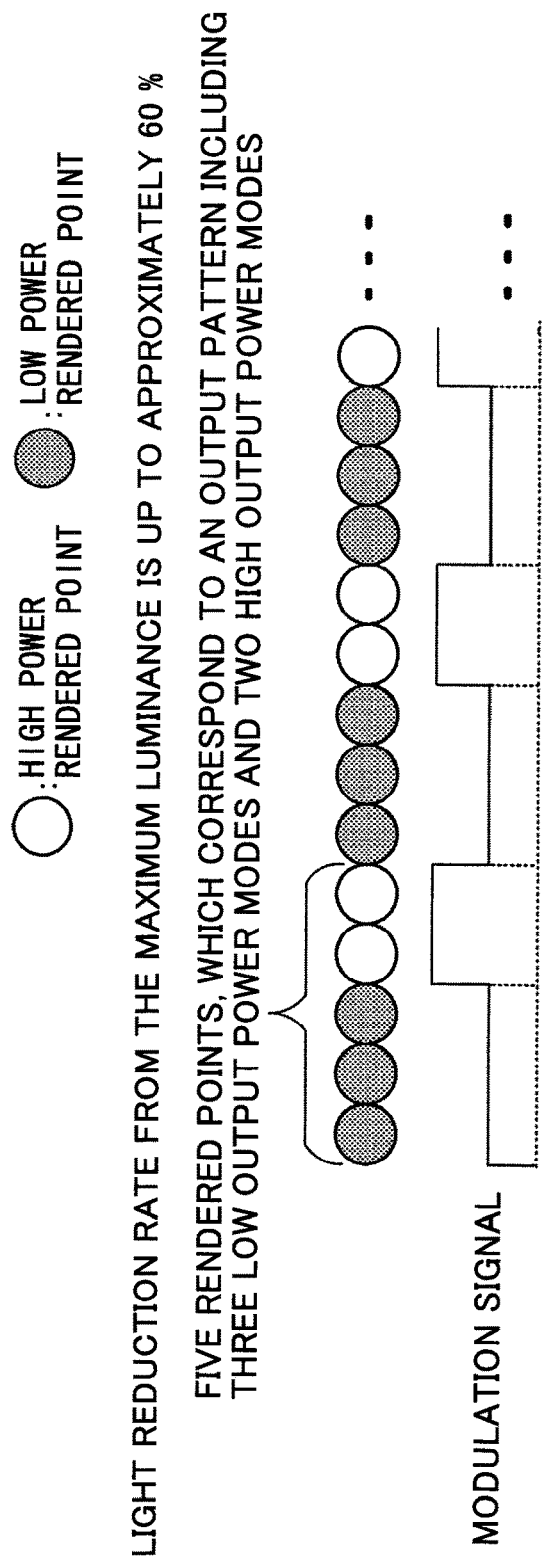

[Fig. 23F]
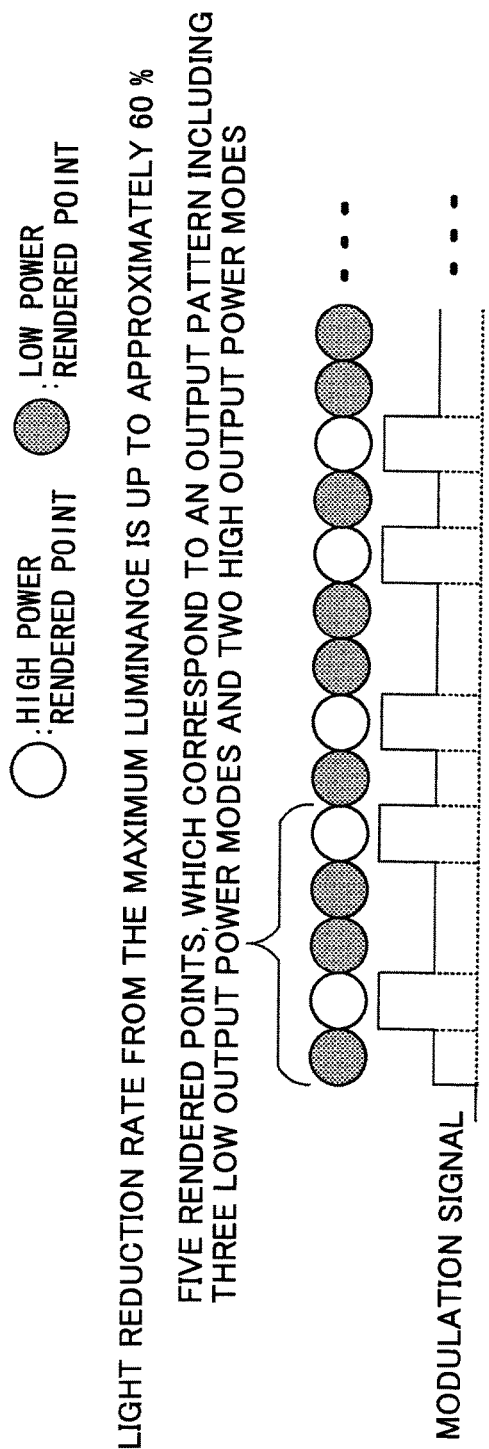

LASER SCANNING DISPLAY WITH LUMINANCE ADJUSTMENT

TECHNICAL FIELD

The present invention relates to a display device, an object apparatus and a display method.

BACKGROUND ART

Conventionally, a device for forming an image by scanning an optical element array including multiple optical elements with light and displaying an image by projecting the light that forms the image (see PLT 1, for example) is known.

CITATION LIST

Patent Literature

[PLT 1] Japanese Unexamined Patent Application Publication No. 2014-132286

SUMMARY OF INVENTION

Technical Problem

The device disclosed in PLT 1 still has room for improvement in terms of adjusting luminance of an image while controlling against luminance unevenness of the image from occurring.

Solution to Problem

One aspect of the present invention provides a display device for scanning with light emitted by a light source an optical element array including a plurality of optical elements to form an image and for projecting the light forming the image, the display device comprising a control unit that is capable of changing output power of the light source while each of the plurality of optical elements is being scanned.

Advantageous Effects of Invention

According to the present invention, it is possible to adjust luminance of an image while controlling against luminance unevenness of the image from occurring.

BRIEF DESCRIPTION OF DRAWINGS

FIG. 1 is a drawing illustrating an overall configuration of a head-up display (HUD) device according to an embodiment of the present invention;

FIG. 2 is a block diagram illustrating a hardware configuration of a control system of the HUD device according to the embodiment of the present invention;

FIG. 3 is a functional block diagram of the HUD device according to the embodiment of the present invention;

FIG. 4 is a drawing for explaining a light source device of the HUD device according to the embodiment of the present invention;

FIG. 5 is a drawing for explaining a light deflector of the HUD device according to the embodiment of the present invention;

FIG. 6 is a drawing illustrating a correspondence relation between a mirror of the light deflector and a scanning region, according to the embodiment of the present invention;

FIG. 7 is a drawing illustrating an example of a trajectory of a scanning line at a time of two-dimensional scanning, according to the embodiment of the present invention;

FIG. 8A is a drawing for explaining a difference in effects, which is caused by difference in sizes of a luminous flux diameter of incident light and a lens diameter of a micro-lens array, according to the embodiment of the present invention;

FIG. 8B is a drawing for explaining a difference in effects, which is caused by difference in sizes of a luminous flux diameter of incident light and a lens diameter of a micro-lens array, according to the embodiment of the present invention;

FIG. 9 is a drawing for explaining a scanning line of the micro-lens array, according to the embodiment of the present invention;

FIG. 10 is a drawing for explaining beam spots on the micro-lens array, according to the embodiment of the present invention;

FIG. 11 is a drawing illustrating a relation between a position of a micro lens at which luminous flux is incident and intensity of a point on the micro lens, according to the embodiment of the present invention;

FIG. 12 is a drawing for explaining intensity distribution of points formed on the micro-lens array in a case of continuously lighting a light source at constant output power, according to the embodiment of the present invention;

FIG. 13 is a drawing for explaining intensity distribution of points formed on the micro-lens array in a case of executing a high output power mode and a low output power mode while each micro lens is being scanned, according to the embodiment of the present invention;

FIG. 14 is a drawing for explaining intensity distribution of points formed on the micro-lens array in a case of performing decreased lighting, according to the embodiment of the present invention;

FIG. 15A is a drawing for explaining a specific example of an output pattern, according to the embodiment of the present invention;

FIG. 15B is a drawing for explaining a specific example of an output pattern, according to the embodiment of the present invention;

FIG. 15C is a drawing for explaining a specific example of an output pattern, according to the embodiment of the present invention;

FIG. 15D is a drawing for explaining a specific example of an output pattern, according to the embodiment of the present invention;

FIG. 15E is a drawing for explaining a specific example of an output pattern, according to the embodiment of the present invention;

FIG. 15F is a drawing for explaining a specific example of an output pattern, according to the embodiment of the present invention;

FIG. 16 is a drawing for explaining a relation of a decrease cycle, a lens cycle and the moire phenomenon, according to the embodiment of the present invention;

FIG. 17A is a drawing for explaining a relation between an effective diameter of incident luminous flux and a distance between adjacent high power rendered points, according to the embodiment of the present invention;

FIG. 17B is a drawing for explaining a relation between an effective diameter of incident luminous flux and a distance between adjacent high power rendered points, according to the embodiment of the present invention;

FIG. 18 is a drawing illustrating a configuration of a light source device in a variation example, according to the embodiment of the present invention;

FIG. 19A is a drawing for explaining micro lens alignment and an aspect ratio of a micro lens, according to the embodiment of the present invention;

FIG. 19B is a drawing for explaining micro lens alignment and an aspect ratio of a micro lens, according to the embodiment of the present invention;

FIG. 19C is a drawing for explaining micro lens alignment and an aspect ratio of a micro lens, according to the embodiment of the present invention;

FIG. 19D is a drawing for explaining micro lens alignment and an aspect ratio of a micro lens, according to the embodiment of the present invention;

FIG. 19E is a drawing for explaining micro lens alignment and an aspect ratio of a micro lens, according to the embodiment of the present invention;

FIG. 19F is a drawing for explaining micro lens alignment and an aspect ratio of a micro lens, according to the embodiment of the present invention;

FIG. 20 is a block diagram illustrating a configuration example of a control unit of an image rendering unit, according to the embodiment of the present invention;

FIG. 21 is a flowchart for explaining a display process, according to the embodiment of the present invention;

FIG. 22A is a drawing for explaining another example of an output pattern, according to the embodiment of the present invention;

FIG. 22B is a drawing for explaining another example of an output pattern, according to the embodiment of the present invention;

FIG. 22C is a drawing for explaining another example of an output pattern, according to the embodiment of the present invention;

FIG. 22D is a drawing for explaining another example of an output pattern, according to the embodiment of the present invention;

FIG. 22E is a drawing for explaining another example of an output pattern, according to the embodiment of the present invention;

FIG. 22F is a drawing for explaining another example of an output pattern, according to the embodiment of the present invention;

FIG. 23A is a drawing for explaining still another example of an output pattern, according to the embodiment of the present invention;

FIG. 23B is a drawing for explaining still another example of an output pattern, according to the embodiment of the present invention;

FIG. 23C is a drawing for explaining still another example of an output pattern, according to the embodiment of the present invention;

FIG. 23D is a drawing for explaining still another example of an output pattern, according to the embodiment of the present invention;

FIG. 23E is a drawing for explaining still another example of an output pattern, according to the embodiment of the present invention; and FIG. 23F is a drawing for explaining still another example of an output pattern, according to the embodiment of the present invention.

DESCRIPTION OF EMBODIMENTS

Overview

The following description explains an HUD device 100 according to an embodiment, with reference to drawings. Note that "HUD" is an abbreviation of "head-up display".

In FIG. 1, an overall configuration of an HUD device 100 according to the present embodiment is schematically illustrated.

Overall Configuration of an HUD Device

Note that projection methods for a head-up display include: a "panel method", in which an intermediate image is formed by means of an imaging device such as a liquid crystal panel, a digital mirror device (DMD) panel or a vacuum fluorescent display (VFD); and a "laser scanning method", in which an intermediate image is formed by means of a two-dimensional scanning device that performs scanning with a laser beam emitted by a laser light source. Particularly, in the latter method, i.e., the laser scanning method, emission or non-emission of light can be assigned for each pixel. Hence, generally, it is possible to form high-contrast images, unlike a panel method, in which images are formed by partially shielding light emission of an entire screen.

Therefore, the "laser scanning method" is employed for the HUD device 100. Needless to say, the "panel method" as described above may be employed as a projection method as well.

For example, the HUD device 100 may be mounted on a vehicle, etc., so that navigation information (e.g., speed of the vehicle, a traveling direction, distance to a destination, a name of a current place, existence and a position of an object (i.e. a target object) in front of the vehicle, a sign such as a speed limit sign, information such as traffic backup information, etc.), which is needed for controlling the vehicle, becomes visible via a front windshield 50 (cf. FIG. 1) of the vehicle. Here, the front windshield 50 functions as a transparent/reflective member, which passes a part of incident light through and reflects at least a part of the remainder. The following description mainly explains examples of an HUD device 100 mounted on a vehicle, or a car, which is provided with a front windshield 50.

As illustrated in FIG. 1, the HUD device 100 is provided with: a light-scanning device 10, which includes a light source device 11, a light deflector 15 and a scanning mirror 20; a screen 30; and a concave mirror 40. The HUD device 100 irradiates the front windshield 50 with light (i.e. imaging light) to form an image, such that a virtual image I becomes visible from a viewing point of a viewer A (i.e., in this example, a driver, who is an occupant of the car). That is to say, the viewer A can see an image (i.e., an intermediate image), which is formed (i.e., rendered) by the light-scanning device 10 on a screen, as a virtual image I via the front windshield 50.

For example, the HUD device 100 may be arranged beneath a dashboard of the car. Further, a distance from the viewing point of the viewer A and the front windshield 50 is from about several tens of centimeters to about a meter at most.

In this example, the concave mirror 40 is designed by means of existing optical-design simulation software, such that the concave mirror 40 has a predetermined amount of light condensing power, so as to form the virtual image I at a desired imaging position.

For the HUD device 100, a setting is provided with respect to light condensing power of the concave mirror 40, such that the virtual image I is displayed at a position (i.e., a perspective position) of, for example, a meter or more to 30 meters or less (preferably 10 meters or less) away from the viewing point of the viewer A.

Note that a front windshield is usually not flat but slightly curved. Therefore, the imaging position of the virtual image I is determined, based on the curved surfaces of the concave mirror 40 and the front windshield 50.

The light source device 11 synthesizes laser light in three colors, i.e., red (R), green (G) and blue (B), which are modulated in accordance with image data. The synthesized light of the laser light in three colors is guided to the reflection surface of the light deflector 15. The light deflector 15, which is provided as a deflection unit, is a two-axis microelectromechanical system (MEMS) scanner, which is manufactured in a semiconductor process, etc., and includes individual micro mirrors that can oscillate with respect to orthogonal two axes. The light source device 11 and the light deflector 15 are explained in detail in the following description.

Light (i.e., synthesized light) in accordance with image data, which is output from the light source device 11, is deflected by the light deflector 15 and reflected by the scanning mirror 20, such that the screen 30 is irradiated. Here, the screen 30 is light-scanned, such that an intermediate image is formed on the screen 30. That is to say, an optical scanning system is configured with the light deflector 15 and the scanning mirror 20. Note that it is preferred that the concave mirror 40 is designed/arranged so as to correct elements of optical distortion caused by the front windshield 50, due to which a horizontal line of an intermediate image would become convex or concave.

Light that has passed through the screen 30 is reflected by the concave mirror 40 towards the front windshield 50. A part of luminous flux incident to the front windshield 50 passes through the front windshield 50 and at least a part of the remainder is reflected towards the viewing point of the viewer A. Consequently, a virtual image I, which is an intermediate image that is magnified, is visible to the viewer A via the front windshield 50. In other words, a magnified virtual image I is displayed on the front windshield 50 from the perspective of a viewer.

Note that, as a transparent/reflective member, there may be a combiner between the front windshield 50 and the viewing point of the viewer A, such that the combiner is irradiated with light from the concave mirror 40. In this case, a virtual image can be displayed as well, similarly to the case with only the front windshield 50.

Hardware Configuration of a Control System of the HUD Device

FIG. 2 is a block diagram illustrating a hardware configuration of a control system of the HUD device 100. As illustrated in FIG. 2, the control system of the HUD device 100 includes an FPGA 600, a central processing unit (CPU) 602, a read-only memory (ROM) 604, a random access memory (RAM) 606, an interface (I/F) 608, a bus line 610, a laser diode (LD) driver 6111 and a MEMS controller 615.

The FPGA 600 operates an LD, which is explained in the following description, by means of the LD driver 6111 in accordance with image data. Further, the FPGA 600 operates the light deflector 15 by means of the MEMS controller 615. The CPU 602 controls each function of the HUD device 100. The ROM 604 stores a program for image processing, which is executed by the CPU 602 for controlling each function of the HUD device 100. The RAM 606 is utilized as a work area of the CPU 602. The I/F 608 is an interface for communication with an external controller, etc. For example, the I/F 608 may be connected to a controller area network (CAN) of a car, etc.

Functional Block Diagram of the HUD Device

FIG. 3 is a block diagram illustrating functions of the HUD device 100. As illustrated in FIG. 3, the HUD device 100 is provided with a vehicle information input unit 800, an external information input unit 802, an image data generating unit 804 and an image rendering unit 806. To the vehicle information input unit 800, information regarding a vehicle such as speed, traveling distance, a position of a target object or brightness of the surrounding environment is input via a CAN, etc. To the external information input unit 802, information regarding outside of a vehicle such as navigation information from a car navigation system that is mounted on a car is input via an external network. The image data generating unit 804 generates image data representing an image to be rendered, based on information that is input from the vehicle information input unit 800, the external information input unit 802, etc., and transmits the image data to the image rendering unit 806. The image rendering unit 806, which is provided with a control unit 8060, depicts an image in accordance with received image data. The image data generating unit 804 and the control unit 8060 are actualized by the FPGA 600. The image rendering unit 806 is actualized by the LD driver 6111, the MEMS controller 615, the light-scanning device 10, the screen 30, the concave mirror 40, etc., in addition to the FPGA 600.

Configuration of the Light Source Device

FIG. 4 is a drawing illustrating a configuration of the light source device 11. As illustrated in FIG. 4, the light source device 11 includes multiple (e.g., three) light emitting elements 111R, 111B and 111G, each of which is provided with a single or multiple luminous points. Each of the light emitting elements is an LD, which emits luminous flux with mutually different wavelengths $\lambda R$, $\lambda G$, or $\lambda B$. For example, $\lambda R$ equals to 640 nm, $\lambda G$ equals to 530 nm, and $\lambda B$ equals to 445 nm. In the following description, the light emitting element 111R may be also represented as an LD 111R, the light emitting element 111G may be also represented as an LD 111G, and the light emitting element 111B may be also represented as an LD 111B. Each of the luminous flux with wavelength $\lambda R$, $\lambda G$ or $\lambda B$, which is emitted by the LD 111R, the LD 111G or the LD 111B, is coupled by a corresponding coupling lens 112R, 112G or 112B before entering into subsequent parts of the optical system. The coupled luminous flux is reshaped by a corresponding aperture member 113R, 113G or 113B. The opening of each aperture member may be in various shapes such as a round shape, an oval shape, a rectangular shape and a square shape, depending on divergence angle of luminous flux, etc. Then, light that is reshaped by a corresponding aperture is synthesized into a light path by a synthesizing element 115. The synthesizing element 115 is a dichroic mirror in a shape of a plate or a prism, which reflects or transmits luminous flux, depending on wavelengths, and synthesizes the luminous flux into a light path. The synthesized luminous flux is guided by a lens 119 towards the reflection surface of the light deflector 15. The lens 119 is a meniscus lens with a concave surface facing the light deflector 15.

Configuration of the Light Deflector

FIG. 5 is a drawing illustrating a configuration of the light deflector 15. The light deflector 15 is a two-axis MEMS scanner, which is manufactured in a semiconductor process. As illustrated in FIG. 5, the light deflector 15 includes: a mirror 150, which has a reflection surface; multiple beams, which are arranged in a direction of the $\alpha$-axis; and a pair of serpentine parts 152, in which each pair of adjacent beams is connected via a turn-around part so as to be serpentine. Each pair of adjacent beams in each serpentine part 152 is either beam A (152*a*) or beam B (152*b*), and is supported by a frame member 154. Each of the multiple beams is individually provided with a piezoelectric member 156 (e.g., a piezoelectric transducer (PZT)). When different voltages are applied to a pair of adjacent beams in each serpentine part, the pair of adjacent beams in each serpentine part are deflected in different directions. Then, due to accumulation of the deflection, the mirror 150 rotates at a large angle around the α-axis (i.e., in the vertical direction). With the above-described configuration, it is possible to perform light-scanning in a vertical direction with the a-axis as the central axis by use of low voltage. Contrarily, in a horizontal direction with the β-axis as the central axis, light-scanning is performed by use of resonance with a torsion bar, etc., that is connected to the mirror 150.

Although the HUD device 100 momentarily projects only a point image that corresponds to a diameter of a laser beam, an afterimage sufficiently remains to human eyes within a frame of an image because scanning is performed extremely quickly. Taking advantage of such an afterimage phenomenon, a viewer perceives as if an image were projected on a "display area". In reality, an image appearing on a screen is reflected by the concave mirror 40 and the front windshield 50, such that a viewer perceives a virtual image of the image on the "display area". Having the above-described mechanism, it is possible to stop emission of an LD, in a case of not displaying an image. In other words, in the "display area", luminance of a non-displaying area of a virtual image can be substantially 0.

As described, imaging of a virtual image is performed by the HUD device 100 at an imaging position in a predetermined "display area", where imaging of the virtual image is possible. The "display area" is determined as specified when designing the HUD device.

Therefore, as a "laser-scanning method" is employed, it is possible to turn off a light of an LD or to decrease an amount of light at a non-displaying area, where displaying is not needed.

Contrarily, in a "panel method", where expression of an intermediate image is performed by means of an imaging device such as a liquid crystal panel or a DMD panel, lighting of the entire panel is necessary. Hence, even with an image signal indicative of a black-display, which is for not displaying, it is difficult to completely achieve 0, due to characteristics of a liquid crystal panel or a DMD panel. Therefore, there have been cases where a black part appears to be glowing (or floating). However, in a laser-scanning method, it is possible to eliminate glowing of black (or black floating).

Note that each emitting element of the light source device 11 is controlled by the FPGA 600 with respect to luminescence intensity, lighting timing and optical waveforms and is driven by the LD driver 6111 to emit light. As illustrated in FIG. 6, light that is emitted by each of the emitting elements and synthesized into a light path is deflected by the light deflector 15 with respect to two dimensions, based on rotation around the a-axis and rotation around the β-axis, and is intermediated by the scanning mirror 20 (cf. FIG. 1) so as to be emitted as scanning light towards the screen 30. That is to say, the screen 30 is scanned by the scanning light in two dimensions. Note that, in FIG. 6, illustration of the scanning mirror 20 is omitted.

The scanning light performs oscillatory scanning (i.e., two-way back-and-forth scanning) in the main-scanning direction at a high-order frequency of approximately 20000 to 40000 Hz and at the same time performs one-way scanning in the sub-scanning direction at a low-order frequency of approximately several tens of Hz. That is to say, raster scanning is performed. Here, rendering per a pixel and displaying of a virtual image can be performed, by controlling emission of each emitting element in accordance with scanning position (i.e., position of the scanning light).

Time for rendering a screen, or scanning time (i.e., a cycle of two dimensional scanning) per a frame, is several tens of milliseconds because, as described above, a sub-scanning cycle is several tens of Hz. For example, in a case where a main-scanning cycle is 20000 Hz and a sub-scanning cycle is 50 Hz, scanning time per a frame is 20 milliseconds.

As described in FIG. 7, the screen 30 includes: an image region 30a (i.e., a valid scanning region), on which an image is rendered (i.e., which is irradiated with light that is modulated in accordance with image data); and a frame region 30b, which encloses the image region.

In the following description, the entire range on which the light deflector 15 is capable of scanning is referred to as a "scanning range". Note that, in this embodiment, the scanning range is a range in combination of the image region 30a and a part (i.e., a part near the outer edge of the image region 30a) of the frame region 30b of the screen 30. In FIG. 7, a trajectory of a scanning line in the scanning range is illustrated with a zig-zag line. In FIG. 7, for convenience, the number of scanning lines is fewer than in reality.

There is a synchronization detecting system 60, which includes a light receiving element, in the peripheral region (i.e., a part of the frame region 30b) near the image region 30a, which is within the scanning range. In the following explanation, the main-scanning direction of the screen 30 is taken to be the X-direction and the sub-scanning direction of the screen 30 is taken to be the Y-direction. In this example, the synchronization detecting system 60 is placed in the positive Y side of the corner, which is in the negative X-direction and positive Y-direction of the image region.

The synchronization detecting system 60 detects operation of the light deflector 15, so as to output, to the FPGA 600, a synchronization signal for determining timing to start scanning and timing to finish scanning.

The image region 30a of the screen 30 is configured with a transparent element having a light diffusion effect such as a micro-lens array. The image region is not required to be in a rectangular or flat shape and may be in a polygonal or round shape. Further, the screen 30 may be a flat or round plate without a light diffusion effect. Further, the image region may be a reflective element having a light diffusion effect such as a micro-mirror array, depending on device layouts.

The following description explains diffusion and occurrence of coherence noise with respect to a micro-lens array employed for an image region of the screen 30, with reference to FIGS. 8A and 8B.

In FIG. 8A, the reference sign 852 is indicative of a micro-lens array. The micro-lens array 852 has a micro convex lens configuration, which includes aligning micro convex lenses 851. A luminous flux diameter 857 of a "pixel displaying beam", which is indicated by the reference sign 853, is smaller than the size of a micro convex lens 851. In other words, the size 856 of the micro convex lens 851 is larger than the luminous flux diameter 857. Note that, in the practical examples of this explanation, the pixel displaying beam 853 is a laser luminous flux with light intensity distribution in the form of Gaussian distribution around the center of the luminous flux. Accordingly, the luminous flux diameter 857 is a radial directional distance of luminous flux that causes light intensity in the light intensity distribution to be decreased down to "$1/e^2$".

Although, in FIG. 8A, the luminous flux diameter 857 is illustrated to be the same size as the size 856 of the micro convex lens 851, the luminous flux diameter 857 is not required to be the same size as "the size 856 of the micro convex lens 851", but is only required not to be larger than the size 856 of the micro convex lens 851.

In FIG. 8A, the entirety of the pixel displaying beam 853 is incident to a micro convex lens 851 and is converted into diffused luminous flux 854 with a divergence angle 855. Note that the "divergence angle" may be referred to as a "diffusion angle" in the following description.

In a situation as illustrated in FIG. 8A, coherence noise does not occur because there is a single diffused luminous flux 854 without any other luminous flux to interfere with. Note that the size of the divergence angle 855 can be adjusted, as needed, with the shape of the micro convex lens 851.

In FIG. 8B, a pixel displaying beam 811 has a luminous flux diameter that is twice as large as the alignment pitch 812 of micro convex lenses. Hence, the pixel displaying beam 811 is incident across two micro convex lenses 813 and 814. In this case, the pixel displaying beam 811 is diffused into two diffused luminous fluxes 815 and 816 because of the two micro convex lenses 813 and 814 to which the pixel displaying beam 811 is incident. As the two diffused luminous fluxes 815 and 816 overlap in a region 817, coherence noise occurs because of mutual interference in the region.

When the coherence noise enters eyes of a viewer, the coherence noise is perceived as speckles. For example, in a case where the luminous flux diameter (i.e., the luminous flux diameter of incident light) of the pixel displaying beam 811 is 100 μm, when the alignment pitch 812 (i.e., the lens alignment pitch) of a micro convex lens 851 is chosen such that the luminous flux diameter of incident light is less than the lens alignment pitch (i.e., typically 110 μm, 150 μm or 200 μm), it is possible to prevent occurrence of coherence noise between micro convex lenses 851. In the following description, a micro convex lens 851 may be referred to as a "micro lens 851," as appropriate. Furthermore, a micro lens may be referred to as a "lens," as appropriate. Multiple micro lenses 851 constituting a micro-lens array 852 respectively correspond to multiple pixels constituting an image rendered on the micro-lens array 852.

Note that, with respect to an HUD device, it is necessary to secure visibility of virtual images in environments with various types of background luminance such as on a road in clear weather, in a tunnel and on a road at night. Therefore, it is required to adjust luminance of virtual images in an exclusively wide dynamic range such as from several cd/m$^2$ to 10000 cd/m$^2$, in accordance with background luminance.

Here, luminance of virtual images can be the highest, in a case of uniformly setting the amount of light of luminous flux (i.e., scanning light) for depicting an image on the micro-lens array to the maximum value with respect to each micro lens, i.e., in a case where light sources (e.g., LDs) are lighted at the maximum output power (i.e., the rated output power) during scanning of the micro-lens array.

Therefore, it is possible to adjust luminance of virtual images by adjusting output power of a light source to be equal to or lower than the maximum output power during scanning of the micro-lens array. In other words, luminance adjustment for virtual images can be performed mainly by decreasing light (by decreasing the amount of scanning light from the maximum value).

Next, the following description explains the scanning line of the micro-lens array 852, with reference to FIG. 9.

Luminous flux via the light deflector 15 scans the micro-lens array 852 two-dimensionally.

In a case where the longitudinal direction (i.e., X-direction) of the micro-lens array 852 is the main-scanning direction and the transverse direction (i.e., Y-direction) of the micro-lens array 852 is the sub-scanning direction, luminous flux is deflected at a high speed in the main-scanning direction and is deflected at a low speed in the sub-scanning direction. With respect to the main-scanning direction, two-way scanning is repeatedly performed on the micro-lens array 852, such that the light sources are lighted (are ON) on the first way 821 and the second way 822 in each two-way scanning.

The scanning line passes through each of the micro lenses 851 of the micro-lens array 852, and luminous flux that has passed through the micro lenses 851 becomes diffused luminous flux. Here, if a person visually observes the micro-lens array 852, the person can see a point on each micro convex lens 851 because diffused luminous flux from the micro convex lens 851 reaches the person's eyes. The person can perceive an image on the micro-lens array 852 because of the arrangement of as many points as the number of micro lenses 851.

Although the following explanation is provided on the premise that each micro lens 851 is square in a plan view, the same discussion can be applied to lenses in any shape in planar view such as lenses in any quadrilateral shape in planar view, lenses in hexagonal shapes in planar views or lenses with different aspect ratios (i.e., horizontal to vertical ratios), as described below.

Next, the following description explains rendered points on the micro-lens array 852, with reference to FIG. 10.

During scanning of the micro-lens array 852 with luminous flux, the control unit 8060 of the image rendering unit 806 generates a modulation signal for each light source (i.e., each color), based on image data obtained from the image data generating unit 804. Further, the control unit 8060 outputs the modulation signal to the LD driver 6111, so as to modulate emission intensity of each light source at a high speed. The higher the frequency of modulation, or modulation frequency (hereinafter also referred to as "clock frequency"), the more finely a pattern can be rendered on the micro-lens array 852. The minimum rendering width 832 (i.e., the distance between the centers of two adjacent points 831) between points 831, which are rendered at an instant, is determined in accordance with a relation between clock frequency and a speed of rendering in the scanning line. Note that a light source is turned on when a modulation signal is at high level (1) and is turned off when the modulation signal is at low level (0). Note that intensity for each light source (i.e., each color) according to a modulation signal is dependent on a proportion of each color (i.e., red, green or blue) represented by color information for each pixel of image data.

In the following description, a point rendered (i.e., formed) on the micro-lens array 852 with luminous flux emitted by a light source when the modulation signal is at a high level is referred to as a "rendered point". The narrower the distances between the centers of rendered points are, the more finely a pattern can be rendered. A "rendered point" may be also referred to as a "beam spot".

Next, the following description explains a relation between a position of a micro lens 851 at which luminous flux is incident and intensity of a point on the micro lens 851, with reference to FIG. 11. Here, with respect to the micro lens 851, it is assumed that the optical center matches the geometric center.

The pixel displaying beam 853 has an intensity profile with Gaussian distribution, which is generally unique to laser light. Therefore, the intensity is high at the center of luminous flux and becomes lower with increasing distance from the center.

Here, the following description is for considering a case of observing a pixel displaying beam 853, which has passed through the micro lens 851, squarely from the micro lens 851.

As illustrated as A in FIG. 11, in a case where a pixel displaying beam 853 with beam intensity illustrated with the solid line is incident to the micro lens 851, intensity of a point on the micro lens 851 is high because the center of the micro lens 851 approximately matches the center of the incident luminous flux.

However, as illustrated as B in FIG. 11, in a case where a pixel displaying beam 853 with beam intensity illustrated with the broken line is incident to the micro lens 851, intensity of a point on the micro lens 851 is low because the center of the micro lens 851 and the center of the incident flux are misaligned, which means that the luminous flux that passes through the center of the micro lens 851 has intensity of the edge of Gaussian distribution. In other words, in FIG. 11, intensity of a point on the micro lens 851 is lower in the case of B, compared to the case of A.

As is clear from the above explanation, intensity of a point on the micro lens 851 becomes lower as the center of luminous flux that is incident to the micro lens 851 is further deviated from the center of the micro lens 851.

Therefore, by scanning the micro-lens array such that multiple beam spots overlap at the center of each micro lens 851, decrease in intensity of a point on the micro lens 851 can be prevented. Consequently, it is possible to reduce luminance unevenness of the entire micro-lens array.

Next, the following description explains intensity distribution of points formed upon scanning on the micro-lens array, with reference to FIG. 12. For ease of explanation, the following explanation herein explains intensity distribution of points formed in a row (i.e., a row of lenses constituted by multiple micro lenses 851 aligning in the main-scanning direction, or a row of lenses corresponding to the first way 821) of the main-scanning direction of the micro-lens array.

In a case where all rendered points are lighted at the same intensity and where the distances (hereinafter also referred to as the "rendered point pitch" or the "beam spot pitch") between the centers of adjacent rendered points 873 on the scanning line are sufficiently narrow, there must exist an instant at which luminous flux passes through nearby the center of each micro lens. Specifically, in a case where the rendered point pitch is narrower than the alignment pitch of micro lenses in the main-scanning direction, there must exist an instant at which luminous flux passes through nearby the center of each micro lens. Thus, since at least one rendered point is formed in each micro lens, brightness unevenness can be prevented.

Next, the following description explains intensity distribution of points formed in a case of lighting a light source repeatedly in an output pattern including at least one high output power mode (e.g., a mode for lighting the light sources at the maximum output power) and at least one low output power mode (e.g., a mode for lighting the light sources at output power that is lower than the maximum output power) during scanning of the micro-lens array. Note that the "high output power mode" is indicative of a mode for lighting a light source at a relatively high output power and the "low output power mode" is indicative of a mode for lighting a light source at a relatively low (i.e., lower than the high output power) output power. Therefore, the "high output power mode" may be a mode for lighting a light source at an output power that is lower than the maximum output power.

Note that, in order to synthesize light from three light sources corresponding to three colors, i.e., RGB, for generating a desired color light (i.e., light corresponding to color information for each pixel of image data), the output level of each light source (i.e., each color) needs to be adjusted. Therefore, it is required that output levels of a high output power mode and a low output power mode differ, depending on each light source, in accordance with a proportion of each color represented by color information for each pixel of image data, except for when generating white color light. That is, the output level of each color of RGB in a pixel A is as follows.

Output level of each color of pixel A=pixel data of corresponding color of pixel A×output mode (e.g., high output mode or low output mode)

When an image is not fine and is simple, and sufficient rendered points can be secured corresponding to the image for generating a desired color light to form a color image, no particular inconvenience arises in allowing an observer to view the color image by forming a color image while alternating the high output mode and the low output mode. For simplifying explanation, reference will not be made to adjustment of output level for color light adjustment, but be made only to output pattern in accordance with high output mode and low output mode (lighting mode and off-light mode).

In FIG. 13, as an example of the above explained output pattern, a light source is lighted repeatedly in an output pattern that includes at least one high output power mode and at least one low output power mode, so as to depict multiple rendered points 873, which are illustrated in FIG. 12, alternately in the high output power mode and in the low output power mode. A rendered point (i.e., a white rendered point in FIG. 13) rendered in the high output power mode is indicated by a rendered point 873H, and a rendered point (i.e., a black rendered point in FIG. 13) rendered in the low output power mode is indicated by a rendered point 873L. In the following description, a rendered point rendered in a high output power mode may be also referred to as a "high power rendered point", and a rendered point rendered in a low output power mode may be also referred to as a "low power rendered point". In FIG. 13, high power rendered points and low power rendered points partially overlap.

When repeating the output pattern in FIG. 13, a total amount of light emitted to the micro-lens array is decreased, compared to a case of uniformly depicting all rendered points in a high output power mode, because a light source is periodically lighted in a low output power mode. Consequently, it is possible to decrease luminance of virtual images.

Furthermore, in the example of FIG. 13, a means for making the pitch of high power rendered points narrower than the alignment pitch of micro lenses in the main-scanning direction is provided in terms of a scanning condition and alignment of lenses. Accordingly, at least one high power rendered point is formed on each micro lens. Therefore, it is possible to prevent unevenness in an amount of light with respect to each micro lens. Consequently, it is possible to prevent luminance unevenness on an entire image.

Next, the following description explains intensity distribution of points on lenses in a case of decreased lighting. Note that the "decreased lighting" is indicative of repeatedly lighting a light source in an output pattern in which a low output power mode is replaced with an off-light mode (i.e., a mode for turning off a light source), or an output pattern including at least one high output power mode (i.e., lighting mode) and at least one off-light mode. In FIG. 14, an example of repeatedly lighting a light source in an output pattern including at least one high output power mode and at least one off-light mode is illustrated. In FIG. 14, small white dots with a reference sign 874 are indicative of timings for executing off-light mode, which are hereinafter also referred to as "zero-power points" for the sake of convenience.

Specifically, the number of rendered points in total when rendering in the output pattern of FIG. 14 is a half of the number of rendered points in total when rendering in the output pattern of FIG. 13. Therefore, in the pattern of FIG. 14, luminance of virtual images is reduced, compared to the output pattern of FIG. 13. That is to say, it is possible to increase a light reduction rate (i.e., a luminance reduction rate) by executing an off-light mode instead of a low output power mode.

Note that, with respect to the output pattern of repeating a high output power mode and an off-light mode, in a case where the rendered point pitch is sufficiently narrow (e.g., in a case where the distance between micro lenses in the main-scanning direction is wider than the rendered point pitch), at least one rendered point is formed on each micro lens. Therefore, it is possible to prevent intensity of points from fluctuating as explained with reference to FIG. 11. That is, if the high output mode and the off-light mode are alternated at least once while one micro lens is being scanned, at least one rendered point is formed for each micro lens. Accordingly, it is possible to prevent luminance unevenness of an image from occurring.

Here, it is possible to change the ratio of the number of high output power modes to the number of low output power modes (or off-light modes) for changing a luminance reduction rate. In this method, it is possible to obtain multiple output patterns with luminance reduction rates that are different from each other.

Thus, with reference to FIGS. 15A through 15F, the following description explains specific examples of output patterns with luminance reduction rates that are different from each other. In FIGS. 15A through 15F, six types of aligning rendered points and six types of modulation signals, which respectively correspond to six output patterns with luminance reduction rates that are different from each other, are illustrated. Here, with respect to each of the output patterns, it is assumed that the output power level in a high output power mode is the maximum output power and that the output power level in a low output power mode is the same in each of the output patterns.

As illustrated in FIG. 15A, it is possible to set the luminance reduction rate from the maximum luminance (i.e., luminance when continuously lighting a light source at the maximum output power; the same applies hereinafter) up to approximately 50%, by alternately arranging high power rendered points and low power rendered points, i.e., by repeatedly lighting a light source in an output pattern constituted by one high output power mode and one low output power mode.

As illustrated in FIG. 15B, it is possible to set the luminance reduction rate from the maximum luminance to 50%, by alternately arranging high power rendered points and zero-power points, i.e., by repeatedly lighting a light source in an output pattern constituted by one high output power mode and one off-light mode.

As illustrated in FIG. 15C, it is possible to set the luminance reduction rate from the maximum luminance up to approximately 66%, by repeatedly arranging one high power rendered point followed by two low power rendered points in series, i.e., by repeatedly lighting a light source in an output pattern constituted by one high output power mode and two low output power modes in series.

As illustrated in FIG. 15D, it is possible to set the luminance reduction rate from the maximum luminance to approximately 66%, by repeatedly arranging one high power rendered point followed by two zero-power points in series, i.e., by repeatedly lighting a light source in an output pattern constituted by one high output power mode and two off-light modes in series.

As illustrated in FIG. 15E, it is possible to set the luminance reduction rate from the maximum luminance up to approximately 75%, by repeatedly arranging one high power rendered point followed by three low power rendered points in series, i.e., by repeatedly lighting a light source in an output pattern constituted by one high output power mode and three low output power modes in series.

As illustrated in FIG. 15F, it is possible to set the luminance reduction rate from the maximum luminance to 75%, by repeatedly arranging one high power rendered point followed by three zero-power points in series, i.e., by repeatedly lighting a light source in an output pattern constituted by one high output power mode and three off-light modes in series.

As is clear from the above explanation, it is possible to change the luminance reduction rate, depending on combination patterns of high output power modes and low output power modes (or off-light modes) in an output pattern. Further, it is possible to increase the luminance reduction rate with increase in the number of low power rendered points and zero-power points. Although luminance unevenness is more likely to occur with increase in the number of low power rendered points and zero-power points, it is possible to prevent occurrence of luminance unevenness by making distances between high power rendered points narrower or equal to the lens diameter of a micro lens, in any case. Note that, although an adjacent pair of rendered points and an adjacent pair of a rendered point and a zero-power point do not have overlapped parts in the illustrations of FIGS. 15A through 15F, it is preferable that there are overlapped parts, on a practical basis.

Note that, although the above explanation is provided with examples of an output pattern constituted by one high output power mode and one low output power mode (or off-light mode) or two or three low output power modes (or off-light modes) in series, there may be an output pattern constituted by one high output power mode and four or more low output power modes (or off-light modes) in series.

Furthermore, there may be an output pattern constituted by multiple high output power modes in series and one low output power mode or multiple low output power modes (or off-light modes) in series as well (see FIGS. 22A through 22D).

As illustrated in FIG. 22A, it is possible to set the luminance reduction rate from the maximum luminance up to approximately 50%, by arranging two high power rendered points in series and two low power rendered points in series, i.e., by repeatedly lighting a light source in an output pattern constituted by two high output power modes in series and two low output power modes in series.

As illustrated in FIG. 22B, it is possible to set the luminance reduction rate from the maximum luminance to 50%, by arranging two high power rendered points in series followed by two zero-power points in series, i.e., by repeatedly lighting a light source in an output pattern constituted by two high output power modes in series and two off-light modes in series.

As illustrated in FIG. 22C, it is possible to set the luminance reduction rate from the maximum luminance up to approximately 25%, by arranging one low power rendered point followed by three high power rendered points in series, i.e., by repeatedly lighting a light source in an output pattern constituted by one low output power mode and three high output power modes in series.

As illustrated in FIG. 22D, it is possible to set the luminance reduction rate from the maximum luminance to 25%, by arranging one zero-power point followed by three high power rendered points in series, i.e., by repeatedly lighting a light source in an output pattern constituted by one off-light mode and three high output power modes in series.

Furthermore, there may be an output pattern constituted in combination of a high output power mode, a low output power mode and a light-out mode as well.

For example, as illustrated in FIG. 22E, it is possible to set the luminance reduction rate from the maximum luminance up to approximately 68%, by arranging one high power rendered point, one low power rendered point and one zero-power point in series, i.e., by repeatedly lighting a light source in an output pattern constituted by one high output power mode, one low output power mode and one off-light mode.

Furthermore, there may be an output pattern constituted in combination of a low output power mode and an off-light mode as well.

As illustrated in FIG. 22F, it is possible to set the luminance reduction rate from the maximum luminance up to approximately 99%, by alternately arranging a zero-power point and a low power rendered point, i.e., by repeatedly lighting a light source in an output pattern constituted by one off-light mode and one low output power mode.

For example, as illustrated in FIG. 23A, it is possible to set the luminance reduction rate from the maximum luminance up to approximately 33%, by arranging two high power rendered points in series and one low power rendered point, i.e., by repeatedly lighting a light source in an output pattern constituted by two high output power modes in series and one low output power mode.

For example, as illustrated in FIG. 23B, it is possible to set the luminance reduction rate from the maximum luminance up to approximately 25%, by arranging three high power rendered points in series and one low power rendered point, i.e., by repeatedly lighting a light source in an output pattern constituted by three high output power modes in series and one low output power mode.

For example, as illustrated in FIG. 23C, it is possible to set the luminance reduction rate from the maximum luminance up to approximately 40%, by arranging three high power rendered points in series and two low power rendered points in series, i.e., by repeatedly lighting a light source in an output pattern constituted by three high output power modes in series and two low output power modes in series.

For example, as illustrated in FIG. 23D, it is possible to set the luminance reduction rate from the maximum luminance up to approximately 40%, by arranging one low power rendered point, one high power rendered point, one low power rendered point, and two high power rendered points in series, i.e., by repeatedly lighting a light source in an output pattern constituted by one low output power mode, one high output power mode, one low output power mode, and two high output power modes in series. In this case, the luminance reduction rate (the ratio of the number of high power rendered points in the output pattern to the number of low power rendered points) is the same as in the case of FIG. 23C, but the arrangements of the high power rendered points and the low power rendered points in the output pattern differ.

For example, as illustrated in FIG. 23E, it is possible to set the luminance reduction rate from the maximum luminance up to approximately 60%, by arranging three low power rendered points in series and two high power rendered points in series, i.e., by repeatedly lighting a light source in an output pattern constituted by three high output power modes in series and two low output power modes in series.

For example, as illustrated in FIG. 23F, it is possible to set the luminance reduction rate from the maximum luminance up to approximately 60%, by arranging one low power rendered point, one high power rendered point, two low power rendered points in series, and one high power rendered point, i.e., by repeatedly lighting a light source in an output pattern constituted by one low output power mode, one high output power mode, two high output power modes in series, and one low output power mode. In this case, the luminance reduction rate (the ratio of the number of high power rendered points in the output pattern to the number of low power rendered points) is the same as in the case of FIG. 23E, but the arrangements of the high power rendered points and the low power rendered points in the output pattern differ.

Furthermore, there may be combinations other than the above, as desired. For example, orders of a high output power mode and a low output power mode (or an off-light mode) are changeable, as needed.

Furthermore, it is possible that there are multiple luminance reduction rates, using multiple different output patterns, with respect to an image (i.e., with respect to a frame).

Furthermore, there may be multiple output patterns based on each of the output patterns as illustrated in FIGS. 15A through 15F and FIGS. 22A through 22F, whose output power levels of at least one of the high output power mode and the low output power mode are different from each other.

In any case, it is preferable to execute the high output power mode and the low output power mode (or off-light mode) at least once each during scanning of each lens, so as to form at least one high power rendered point and at least one low power rendered point (or zero-power point) on each lens. Furthermore, when repeatedly executing an output pattern, it is preferable that each output pattern (i.e., an output pattern as a unit) corresponds to one pixel, or one micro lens.

As is clear from the above explanation, an output pattern for a desired luminance reduction rate can be obtained by combination of at least two of a high output power mode, a low output power mode and an off-light mode, as appropriate.

Next, the following description explains the moire phenomenon, which occurs due to the decrease cycle and the lens cycle (i.e., the alignment pitch of lenses in the main-scanning direction), with reference to FIG. 16. With respect to decreased lighting, the "decrease cycle" may be indicative of a lighting cycle (i.e., a cycle of a lighting mode), an off-light cycle (i.e., a cycle of an off-light mode), a rendered point pitch (i.e., the distance between the centers of adjacent rendered points in the main-scanning direction) or a zero-power point pitch (i.e., the distance between the centers of adjacent zero-power points in the main-scanning direction).

In FIG. 16, luminance unevenness on an image becomes more likely to occur with increase in a width of a dark area 874 (i.e., a zero-power point) between rendered points 873.

Generally, it is impossible to completely match a decrease cycle and a lens cycle, and therefore zero-power points and lenses are arranged in different cycles, as illustrated in FIG. 16. Here, the position of the center of a lens relative to a rendered point continuously changes, with respect to each lens. As illustrated with reference to FIG. 11, the intensity of points lowers when the center of a lens deviates relative to a rendered point. Consequently, the decrease cycle and the lens cycle generate spatial beat, which causes luminance of points to be perceived as a long-period pattern with respect to the main-scanning direction, as illustrated in FIG. 16. This phenomenon is known "moire" (hereinafter also simply referred to as "moire"), which is caused by the decrease cycle and the lens cycle. Specifically, a partial luminance reduction occurs and a moire pattern as a whole is likely to be visually observed at a position where at least one rendered point is not formed on the micro lens, and a beam spot is irradiated to the boundary portion between the micro lenses.

Even though the decrease cycle is originally as wide as one lens, the cycle is enlarged into a long-period pattern that is as wide as several or several tens of lenses, which is easily perceived by human eyes, due to moire. Consequently, visibility of an image is decreased.

Therefore, in order to prevent moire, as described above, it is preferable to light a light source such that at least one rendered point is formed on each micro lens during scanning of a micro-lens array.

Next, the following description explains a relation between the diameter (i.e., the beam spot diameter) of luminous flux incident to a lens and the rendered point pitch (i.e., the beam spot pitch in the main-scanning direction), with reference to FIGS. 17A and 17B.

Luminance unevenness associated with reduction of light changes, depending on the diameter of incident luminous flux. Luminance unevenness is prevented more with increase in the diameter of the incident luminous flux.

Here, the diameter of incident luminous flux is defined to be the diameter (hereinafter also referred to as an "effective diameter") having intensity that is $1/e^2$ of the peak intensity of the luminous flux. As a result of functional assessment by the inventors, it has been concluded that luminance unevenness is at a functionally acceptable level regardless of period of luminance unevenness, in a case where luminance unevenness (i.e., depth of the valley between the two beam intensity of high power rendered points, which partially overlap as illustrated in FIG. 17A) is equal to or lower than a half of the peak intensity.

In FIG. 17B, a result of numerical calculation for a relation between a ratio of the effective diameter to the distance between adjacent high power rendered points (the distance between centers of the adjacent high power rendered points) and luminance unevenness is illustrated. It is clear from FIG. 17B that, in order to make luminance unevenness that occurs to equal to or lower than a half of the peak intensity, the diameter (i.e., the effective diameter) of incident luminous flux needs to be equal to or higher than 1.2 times as wide as the distance between the adjacent high power rendered points. In the above way, luminance unevenness can be at an acceptable level.

Next, the following description explains a light source device 11' according to a variation example, with reference to FIG. 18.

As illustrated in FIG. 18, the light source device 11' is provided with: three LDs (i.e., LD1 through LD3) as light sources; coupling lenses CL1 through CL3 for coupling light emitted by the LD1 through LD3, respectively; aperture members AP1 through AP3 for reshaping the light that has traveled through the coupling lenses CL1 through CL3, respectively; a mirror M for reflecting the light that has reshaped by the aperture member AP1; a prism Q1 as a light path synthesizing element, which is arranged on the light path of the light that has been reflected by the mirror M and the light that has been reshaped by the aperture member AP2; a prism Q2 as a light path synthesizing element, which is arranged on the light path of the light that has traveled through the prism Q1 and the light that has been reshaped by the aperture member AP3; a prism Q3 for branching the light that has traveled through the prism Q2 into transmitted light and reflected light; a lens L for collecting the light reflected by the prism Q3; and a light amount detecting unit including a photo diode (PD) as a light receiving element, which receives the light that has traveled through the lens L. The transmitted light from the prism Q3 is guided to the light deflector 15 for rendering an image.

Generally, wavelength and an amount of light from a light source change, depending on temperature. Therefore, luminance or color generated under a predetermined temperature cannot be steadily maintained. Thus, in the variation example, in order to control an amount of light during operation of each light source, light from each light source is branched by the branching element (i.e., the prism Q3, in the above case) as illustrated in FIG. 18. Further, one of the branched light is guided to the light deflector 15 and the other of the branched light is guided to the light receiving element (i.e., the PD, in the above case), so as to monitor the amount of light at a given moment. It is preferable that monitoring of an amount of light from each light source is performed by lighting each light source in a sequential order while an image is not being rendered on the screen 30, i.e., while the frame region 30b is being scanned or at an interspace between continuing frames.

In a case where a high output power mode and a low output power mode are periodically executed or where light is periodically turned on and off as described in the present embodiment, it is possible that unexpected change in an amount of light due to deformation of a response waveform with respect to a light source is more likely to occur, compared to continuous lighting as regularly performed. As a result, when reducing light, there tends to be a case where luminance of an image is not controlled as expected or where color shift occurs.

To attend to the above problem, when reducing light, a high output power mode and a low output power mode (or off-light mode) are periodically repeated even at a time of causing light flux to be incident to the PD, similarly to the time of generating rendering light (i.e., scanning light), so as to accurately detect an amount of light during an operation mode at a given moment (i.e., a high output power mode or a low output power mode). Consequently, even when reducing light at a time of rendering an image, it becomes less possible that shift in luminance or color shift occurs.

Note that, as the light receiving element, a phototransistor, an avalanche photodiode (APD), etc., may be used, other than a PD.

Next, the following description explains an example of lens alignment and an aspect ratio of a lens on a micro-lens array, with reference to FIGS. 19A through 19F.

Although, in the description above, the explanation is provided with an example of employing a micro-lens array in which square lenses in planar views are aligned in a square as illustrated in FIG. 19A, the same discussion can be applied to micro-lens arrays with different shapes and different lens alignment.

For example, the present invention can be applied to a micro-lens array in which hexagonal lenses in planar views are aligned in a honeycomb structure, as illustrated in FIGS. 19B and 19C, and to a micro-lens array including lenses as illustrated in FIGS. 19A, 19B and 19C whose aspect ratios are changed, respectively, as illustrated in FIGS. 19D, 19E and 19F.

Specifically, in a case of a micro-lens array having horizontally wide lenses whose width in the main-scanning direction is wider than a width in the sub-scanning direction, as illustrated in FIGS. 19D, 19E and 19F, it is easier to change an amount of light from light sources during scanning of each lens. That is to say, it is easier to form at least one high power rendered point and at least one low power rendered point (or zero-power point) on each lens.

In a case of lengthening an off-light time (i.e., a horizontal width of a zero-power point) for increasing the light reduction rate, it is necessary to prepare lenses that are wider in the main-scanning direction, accordingly.

In order to control against luminance unevenness in addition to changing an amount of light of a light source during scanning of each lens, it is preferable that the width of the lens in the sub-scanning direction is narrower. Specifically, it is preferable that the width of each lens in the sub-scanning direction is narrower than the width of the lens in the main-scanning direction. In the above way, the light reduction rate can be increased while preventing occurrence of luminance unevenness.

The following description explains a configuration example of the control unit 8060 of the image rendering unit 806, which is provided in the HUD device 100 according to the present embodiment, with reference to FIG. 20.

The control unit 8060 includes an output pattern selecting unit 8060*a* and a modulation signal generating unit 8060*b*, as illustrated in FIG. 20.

Here, a storing unit 605, which is actualized by the ROM 604 and the RAM 606, pre-stores a table in which ten brightness ranges that are set on a step-by-step basis respectively correspond to nine output patterns; similar to as illustrated in FIGS. 15A through 15F and FIGS. 22A through 22F, denoted as P1, P2, . . . , P8, P9 (the light reduction rate becomes higher with increase in the number), each of which having a light reduction rate that is different from one another; and to an output pattern P0, which has a light reduction rate of 0 (i.e., in which light is continuously lighted at the maximum output power). Among the ten brightness ranges, the brightest range (e.g., a range envisioned for a road in a clear weather) corresponds to the output pattern P0, and the darkest range (e.g., a range envisioned for a road at night or in a tunnel) corresponds to the output pattern P9. That is to say, the ten brightness ranges correspond to the ten output patterns, respectively, in the order of brightness. Here, light reduction rates of the output patterns with respect to the maximum luminance are 10% in P1, 20% in P2, 30% in P3, 40% in P4, 50% in P5, 60% in P6, 70% in P7, 80% in P8 and 90% in P9. Note that the number of the output patterns and brightness ranges is not limited to the above (i.e., ten, respectively). The point is that the number should be at least two, respectively.

The output pattern selecting unit 8060*a* obtains brightness information around the vehicle from the vehicle information input unit 800, refers to the above-described table stored in the storing unit 605, selects an output pattern corresponding to the brightness information that is obtained out of the ten output patterns, and transmits the selected output pattern to the modulation signal generating unit 8060*b*. Note that the vehicle information input unit 800 obtains brightness information around the vehicle from a luminance sensor, etc., which is provided on the vehicle, etc.

The modulation signal generating unit 8060*b* generates a modulation signal for each light source (i.e., each color), based on image data from the image data generating unit 804 and an output pattern from the output pattern selecting unit 8060*a* and outputs the modulation signal to the LD driver 6111. Here, the modulation signal for each color is generated by multiplying a proportion of each color represented by color information for each pixel of the image data with the output power levels of a high output power mode and a low output power mode included in the output pattern.

The LD driver 6111 applies driving current, which has a current value corresponding to intensity according to each modulation signal and has the same frequency as the modulation signal, to a corresponding light source, so as to light the light source.

Next, the following description explains a display process that is performed in the HUD device 100 according to the present embodiment, with reference to FIG. 21. The flowchart of FIG. 21 corresponds to a processing algorithm that is executed by the control unit 8060.

At the first step, or Step S1, the modulation signal generating unit 8060*b* obtains image data from the image data generating unit 804. Note that the image data generating unit 804 starts generating image data when an electric system of a vehicle, on which the HUD device 100 is mounted, is turned on.

At the next step, or Step S2, the output pattern selecting unit 8060*a* obtains brightness information around the vehicle from the vehicle information input unit 800.

At the next step, or Step S3, the output pattern selecting unit 8060*a* selects an output pattern, based on the obtained brightness information. Specifically, referring to the above-described table, which is stored in the storing unit 605, an output pattern that corresponds to the obtained brightness information is selected and transmitted to the modulation signal generating unit 8060*b*.

At the next step, or Step S4, the modulation signal generating unit 8060*b* generates a modulation signal for each light source, by use of the obtained image data and the output pattern that has been received.

At the next step, or Step S5, each light source is driven. Specifically, the modulation signal generating unit 8060*b* outputs a modulation signal generated for each light source to the LD driver 6111, for driving each light source. In this way, a pulse light with intensity in accordance with image data and with an output pattern is emitted from each light source in a synchronized manner. Consequently, a color virtual image with desired resolution (i.e., a specified value according to device specifications) and brightness is displayed in the display area.

At the next step, or Step S6, whether or not to terminate the process is determined. Specifically, when the electric system of the vehicle, on which the HUD device 100 is mounted, is turned from on to off, the process is terminated to end the flow. When the electric system of the vehicle, on which the HUD device 100 is mounted, remains being on, the process is continued and returned back to Step S1.

Note that, in FIG. 21, Step S1 may be performed after performing Steps S2 and S3.

The HUD device 100 according to the present embodiment explained above is, from a first viewpoint, a display device for scanning with light emitted by a light source (e.g., an LD) an optical element array (e.g., a micro lens array) including multiple optical elements (e.g., micro lenses) to form an image and for projecting the light that has formed the image. The display device includes a control unit 8060 that is capable of changing output power of the light source while each of the multiple optical elements is being scanned. Note that "capable of changing output power of the light source", indicating ability to change output power of a light source, includes decreasing of the output power of the light source to 0 and increasing of the output power of the light source from 0 in the changing. Furthermore, in this specification, a term "image" is utilized to additionally include a virtual image, as appropriate.

Furthermore, the HUD device 100 according to the present embodiment explained above is, from a second viewpoint, a display device including: a light source (i.e., an LD); a light deflector 15 configured to deflect light emitted by the light source; an optical element array (e.g., a micro lens array) including multiple optical elements (e.g., micro lenses), which is scanned with the light via the light deflector 15; a light projecting unit (e.g., a concave mirror 40) configured to project the light that has traveled through the optical element array; and a control unit 8060 that is capable of changing output power of the light source while each of the multiple optical elements is being scanned with the light via the light deflector 15.

By use of the HUD device 100 according to the present embodiment, it is possible to change output power of a light source while each optical element is being scanned. That is, it is possible to change the output power of a light source while one optical element is being scanned. Therefore, it is possible to adjust luminance of an image while controlling against luminance unevenness of the image from occurring.

Furthermore, it is preferable that the control unit 8060 executes each of a high output power mode and a low output power mode at least once while each of the multiple optical elements is being scanned, so as to change the output power of the light source while each of the plurality of optical elements is being scanned. The high output power mode relatively increases the output power of the light source. The low output power mode relatively decreases the output power of the light source.

In this case, it is possible to adjust luminance of each pixel while controlling against luminance unevenness of the image from occurring, as at least one high power rendered point and at least one low power rendered point are formed on each optical element.

Furthermore, it is preferable that a distance between centers of two adjacent beam spots, which are included in beam spots formed side-by-side in a scanning direction on the optical element array during the high output power mode, is narrower than a width of each of the plurality of optical elements in the scanning direction.

In other words, it is preferable that at least one beam spot is formed on each of the multiple optical elements during the high output power mode.

Furthermore, it is preferable that the control unit 8060 repeatedly executes an output pattern including each of the high output power mode and the low output power mode at least once. In this case, control is simplified.

Furthermore, for example, the output pattern includes each of the high output power mode and the low output power mode once. In this case, control is extremely simplified.

Furthermore, it is possible that the output pattern includes the high output power mode once and includes the low output power mode multiple times. In this case, it is possible to increase the light reduction rate.

Furthermore, it is preferable that there are multiple output patterns that correspond to multiple brightness ranges, respectively, and that the control unit 8060 obtains brightness information about the surrounding environment and repeatedly executes one of the multiple output patterns in accordance with the brightness information that has been obtained. In this case, it is possible to adjust luminance of images to a proper level in accordance with brightness of surrounding environment. Note that, in order to improve visibility, it is preferable that luminance of an image is higher as brightness of the surrounding environment is brighter. Consequently, it is possible to display a virtual image with high visibility, regardless of brightness of environment surrounding a vehicle, on which the HUD device 100 is mounted.

Furthermore, it is preferable that the HUD device 100 further includes a light amount detecting unit for detecting an amount of light from a light source. Further, it is preferable that the light amount detecting unit detects the amount of light in a cycle that is as long as an integer (value) times a cycle for repeating an output pattern.

Here, for example, in a case where an output pattern is executed m times for scanning the screen 30 once (i.e., for depicting an image of a frame), it is possible to detect an amount of light from a light source while the image is not being rendered (i.e., while the frame region 30b is being scanned or at an interspace between continuing frames), by detecting an amount of light from each light source in a cycle of m×T, in a case of T being a cycle of the output pattern.

Furthermore, it is possible that the low output power mode is a mode for turning the output power of the light source to 0. That is to say, it is possible that the low output power mode is interpreted to include an off-light mode, in a broad sense. In a case where there are a low output power mode and an off-light mode, the high output power mode may be referred to as a lighting mode, in a broad sense.

Furthermore, it is possible that the control unit 8060 controls a timing of lighting a light source such that multiple beam spots are aligned in the scanning direction on each optical element, so as to change output power of the light source while each optical element is being scanned.

Furthermore, it is preferable that one of the multiple beam spots partially overlaps with another one or more of the beam spots and that an overlapped area of the one of the beam spots and the one or more of the beam spots is located at the optical center of an optical element.

In this case, it is preferable that multiple overlapped areas of beam spots are located at the optical center of the optical element. More specifically, it is preferable that an overlapped area of at least one high power rendered point, or at least one low power rendered point, an overlapped area of multiple high power rendered points and an overlapped area of multiple low power rendered areas are located at the optical center of the optical element. In this case, it is possible to prevent luminance unevenness of each pixel.

Furthermore, it is possible that a single one (i.e., a high power rendered point or a low power rendered point) of the multiple beam spots is located at the optical center of each of the optical elements.

Furthermore, it is possible that the control unit 8060 controls the timing of lighting a light source such that a single beam spot (i.e., a high power rendered point or a low power rendered point) is located at each optical element, so as to change output power of the light source while each optical element is being scanned.

Furthermore, it is preferable that a single beam spot (i.e., a high power rendered point or a low power rendered point) is located at the optical center of the optical element. It is further preferable that the optical center of the optical element is located nearby the center of the single beam spot.

Furthermore, it is preferable that the control unit 8060 controls the timing of lighting a light source so as to minimize a difference, in center-to-center distance in a distance of beam spots adjacent in the main-scanning direction, of the central area (hereinafter also referred to as a "main-scanning central area") with the edge areas (hereinafter also referred to as a "main-scanning edge areas") of the optical element array in the main-scanning direction. In other words, it is preferable that the control unit 8060 controls the timing of lighting a light source so as to minimize a difference, of a central area with edge areas of the optical element array in the scanning direction, with respect to in center-to-center distance of beam spots adjacent in the scanning direction. More specifically, as a characteristic of a light deflector 15, scanning speed becomes slower when the main-scanning edge areas are being scanned, compared to when the main-scanning central area is being scanned. Therefore, in a case of lighting a light source at constant clock frequency (i.e., modulation frequency), a distance between beam spots in the main-scanning direction at the main-scanning edge areas becomes narrower, compared to the main-scanning central area. Thus, luminance of the main-scanning edge areas is increased, compared to luminance of the main-scanning central area. In other words, luminance varies in the main-scanning direction.

Therefore, it is possible to prevent luminance from varying in the main-scanning direction, by setting clock frequency for scanning the main-scanning edge areas higher than clock frequency for scanning the main-scanning central area.

Furthermore, it is preferable that the effective diameter (i.e., $1/e^2$) of each beam spot in the scanning direction is more than 1.2 times wider than a distance between centers of beam spots adjacent in the scanning direction. In this case, it is possible to reduce moire and noise of an image, as deviation of luminance at the micro level is reduced. It is preferable that the beam spots adjacent in the scanning direction are high power rendered points.

Furthermore, it is preferable that a width of an optical element in the main-scanning direction is wider than a width of the optical element in the sub-scanning direction (i.e., a direction orthogonal to the main-scanning direction). In this case, multiple rendered points or multiple points including at least one rendered point and at least one zero-power point can be easily formed on each optical element. That is to say, freedom of choice for clock frequency (i.e., modulation frequency) to drive a light source is enhanced.

Furthermore, the HUD device 100 according to the present embodiment is, from a third viewpoint, a display device for scanning with light emitted by a light source an optical element array including multiple optical elements to form an image and for projecting the light that has formed the image. The display device includes a control unit that is capable of turning on and off the light source while each of the multiple optical elements is being scanned.

In this case, it is possible to adjust luminance of an image while controlling against luminance unevenness of the image from occurring, as it is possible to turn on and off the light source while each optical element is being scanned, that is, as it is possible to turn on and off the light source during the scanning of one optical element.

Furthermore, by use of a vehicle apparatus including an HUD device 100 according to the present embodiment and a vehicle (i.e., an object), on which the HUD device 100 is mounted, it is possible to provide useful information to a driver (i.e., viewer) with high visibility, regardless of change in traveling environment of a vehicle (e.g., change in climate, change between day and night, when getting in or out of a structure).

Furthermore, a display method according to the present embodiment is a display method for scanning with scanning light an optical element array including multiple optical elements and for projecting light that has traveled through the optical element array to display an image. The display method includes changing an amount of the scanning light while each of the multiple optical elements is being scanned with the scanning light. Note that "changing an amount of the scanning light" includes decreasing the amount of the scanning light to 0 and increasing the amount of the scanning light from 0.

By use of the display method according to the present embodiment, it is possible to adjust luminance of an image while controlling against luminance unevenness of the image from occurring, as an amount of scanning light is changed while each optical element is being scanned, that is, as an amount of scanning light is changed during the scanning of one optical element.

Note that although the explanation in the above-described embodiment is provided with an example of a micro-lens array including multiple micro lenses as optical elements, the same discussion can be applied to a case of employing a micro-mirror array including multiple micro mirrors as optical elements, instead of a micro-lens array. In the case of employing a micro-mirror array, it is necessary to change layout from the layout for the optical system of an HUD device as illustrated in FIG. 1. For example, it is possible to omit the scanning mirror 20 and arrange a micro-mirror array on the light path between the light deflector 15 and the concave mirror 40. Further, it is possible to arrange, instead of the scanning mirror 20, a lens for making the light that has been deflected by the light deflector 15 to become approximately parallel light, and to arrange a micro-mirror array between the lens and the concave mirror 40.

Note that although the HUD device 100 according to the above-described embodiment is provided with a flat screen 30, it is possible to employ a curved screen that is convex on the outgoing surface along the main-scanning direction, for example. Here, it is possible to almost completely stabilize length of the light path from the light deflector 15 to the screen in an in-plane direction of the screen, even in a case of omitting the scanning mirror 20 and employing a configuration for directly guiding light that has been deflected by the light deflector 15 to the screen or in a case of employing a flat mirror as the scanning mirror 20 (in FIG. 1, the scanning mirror 20 is a convex mirror).

Furthermore, although the optical system in the HUD device according to the above-described embodiment is configured with the concave mirror 40 (i.e., a concave mirror), there is no such limitation. For example, the optical system may be configured with a convex mirror and may be configured with a curved mirror (i.e., a concave or convex mirror) and a turning mirror, which is arranged between the curved mirror and the screen 30.

Furthermore, although an LD (i.e., an edge emitting laser) is employed as a light source in the above embodiment, another type of laser such as a surface emitting laser may be employed.

Furthermore, although the HUD device in the above-described embodiment is configured to accommodate color images, the HUD device may be configured to accommodate monochrome images.

Furthermore, the transreflective member is not limited to a front windshield of a vehicle, and may be a side windshield or rear windshield, for example. That is to say, it is preferable that the transreflective member is provided on a vehicle, where a viewer who views a virtual image is aboard, and the transreflective member is a window member (such as a windshield) for the viewer to view the outside of the vehicle.

Furthermore, although the explanation in the above-described embodiment is provided with an example of an HUD device mounted on a car, etc., the point is that the HUD device is mounted on a movable object such as a vehicle, an aircraft, a vessel or a robot. A vehicle used as an "object apparatus" in the present invention is not limited to a four-wheeled car, and may be a motorcycle, a motor tricycle, etc. In the above cases, it is required to be equipped with a windshield or a combiner as a transreflective member. Furthermore, a power source of a vehicle may be an engine, a motor or combination of an engine and a motor, etc.

Furthermore, it is possible that the display device according to the present invention is applied to a device for displaying an image (including a virtual image) such as a projector, a prompter or a head-mounted display, not being limited to an HUD device.

That is to say, the display device according to the present invention may be one that is attached to or mounted on an object such as a moving object, a human body or a motionless object (including an object that is conveyable and an object that is permanently equipped), and may be one that is used independently.

For example, in a case of applying the display device according to the present invention to a projector, it is possible to use the optical system of the HUD device 100. Specifically, it is possible to directly project light, which has been emitted from a light source device 11 via a light deflector 15 and a screen 30, to a projected object such as a projection screen, a table, a floor or a ceiling. Further, it is possible to project the light, after traveling through the screen 30, to a projected object as described above via a lens or a mirror.

Furthermore, the specific numerical values, shapes, etc., used in the above-described embodiment are examples and therefore changeable, as needed, without departing from the scope of the present invention.

The following description describes a thinking process of the inventors to propose the invention of the above-described embodiment.

Conventionally, with respect to a display device, such as a laser-scanning type display and a head-up display, for scanning a micro-lens array with light to form an intermediate image, there has been a control method (i.e., decrease method) for decreasing pixels such that some of the pixels constituting image data are not displayed in accordance with a predetermined rule, for a purpose of adjusting luminance, or especially for a purpose of reducing light (see PLT 1, for example).

However, in the conventional decrease method that is disclosed in PLT 1, etc., it is expected that an image quality becomes lower (i.e., resolution is decreased) as some pixels are not rendered due to the decrease. In other words, it has been difficult, with the conventional decrease method, to adjust luminance of an image while preventing resolution of the image from decreasing.

Therefore, the inventors proceeded to propose the invention of the above-described embodiment to actualize an HUD device that is capable of adjusting luminance of an image while controlling against luminance unevenness of the image from occurring.

Further, the present invention is not limited to these embodiments, but various variations and modifications may be made without departing from the scope of the present invention.

15 light deflector
30 screen (i.e., member including an optical element array)
40 concave mirror (i.e., light projecting unit)
50 front windshield (transparent/reflective member)
100 HUD device (i.e., display device)
111R, 111G, 111B light emitting element (i.e., light source)
8060 control unit The present application is based on and claims the benefit of priority of Japanese Priority Application No. 2017-049274 filed on Mar. 15, 2017, and Japanese Priority Application No. 2018-006229 filed on Jan. 18, 2018, the entire contents of which are hereby incorporated herein by reference.

The invention claimed is:

1. A display device comprising:
a light source;
a light deflector configured to deflect light emitted by the light source;
an optical element array including a plurality of optical elements, which is scanned with the light deflected via the light deflector;
a mirror configured to project the light that has traveled through the optical element array; and
a control unit that is capable of changing an output power of the light source at least once while each of the plurality of optical elements is being scanned with the light deflected via the light deflector, wherein
the control unit changes the output power of the light source by executing
a high output power mode in which the output power of the light source is increased; and
a low output power mode in which the output power of the light source is decreased, and
a distance between centers of two adjacent beam spots, which are included in beam spots formed side-by-side in a scanning direction on the optical element array during the high output power mode, is narrower than a width of each of the plurality of optical elements in the scanning direction.

2. The display device according to claim 1,
wherein at least one beam spot is formed on each of the plurality of optical elements during the high output power mode.

3. The display device according to claim 1,
wherein the control unit repeatedly executes an output pattern including each of the high output power mode and the low output power mode at least once.

4. The display device according to claim 3, wherein
the output pattern includes each of the high output power mode and the low output power mode once.

5. The display device according to claim 3, wherein
the output pattern includes the high output power mode once and includes the low output power mode a plurality of times.

6. The display device according to claim 3,
wherein the output pattern is selected from a plurality of output patterns that correspond to a plurality of brightness ranges, respectively, and
wherein the control unit obtains brightness information about surrounding environment and repeatedly executes the output pattern, which is selected from the plurality of output patterns in accordance with the brightness information that has been obtained.

7. The display device according to claim 1, further comprising:
wherein the low output power mode is a mode for turning the output power of the light source to 0.

8. The display device according to claim 1, further comprising:
a light amount detecting unit configured to detect an amount of the light emitted by the light source,
wherein the light amount detecting unit detects the amount of the light in a cycle that is as long as an integer times a cycle for repeating the output pattern.

9. The display device according to claim 1,
wherein the control unit controls a timing of lighting the light source such that a plurality of beam spots are aligned in the scanning direction on each of the plurality of optical elements, so as to change the output power of the light source while each of the plurality of optical elements is being scanned.

10. The display device according to claim 9,
one of the plurality of beam spots partially overlaps with another one or more of the plurality of beam spots, and
wherein an overlapped area of the one of the plurality of beam spots and the said another one or more of the plurality of beam spots is located at an optical center of the each of the plurality of optical elements.

11. The display device according to claim 9,
wherein a single one of the plurality of beam spots, which is included in the plurality of beam spots, is located at an optical center of the each of the plurality of optical elements.

12. The display device according to claim 9,
wherein the control unit controls the timing of lighting the light source so as to minimize a difference, of a central area with edge areas of the optical element array in the scanning direction, with respect to in center-to-center distance of beam spots adjacent in the scanning direction.

13. The display device according to claim 9,
wherein an effective diameter of each of the plurality of beam spots in the scanning direction is more than 1.2 times wider than the distance between centers of beam spots adjacent in the scanning direction.

14. The display device according to claim 1, wherein
a width of each of the plurality of optical elements in the scanning direction is wider than a width of each of the plurality of optical elements in a direction orthogonal to the scanning direction.

15. An object apparatus comprising:
the display device according to claim 1; and
an object, on which the display device is mounted.

16. A display method for scanning an optical element array including a plurality of optical elements with scanning light and for projecting light that has traveled through the optical element array to display an image, the display method comprising:
scanning each of the plurality of optical elements with the scanning light;
changing an output power of a light source that emits the scanning light at least once while each of the plurality of optical elements is being scanned with the scanning light to execute each of a high output power mode and a low output power mode, wherein
the high output power mode increases the output power of the light source,
the low output power mode decreases the output power of the light source, and
a distance between centers of two adjacent beam spots, which are included in beam spots formed side-by-side in a scanning direction on the optical element array during the high output power mode, is narrower than a width of each of the plurality of optical elements in the scanning direction.

17. The display device according to claim 1, wherein
the control unit executes the low output power mode by turning-off the light source.

* * * * *